United States Patent
Shi et al.

(10) Patent No.: US 8,545,209 B2
(45) Date of Patent: Oct. 1, 2013

(54) THREE-DIMENSIONAL OBJECT FORMING APPARATUS AND METHOD FOR FORMING THREE-DIMENSIONAL OBJECT

(75) Inventors: Kwo Yuan Shi, Hsin-Chu (TW); Ching Sung Lin, Hsin-Chu (TW); Chin Tsung Chen, Hsin-Chu (TW); Ya Ching Tung, Hsin-Chu (TW); Ke Ming Huang, Hsin-Chu (TW)

(73) Assignee: Microjet Technology Co., Ltd. (TW)

( * ) Notice: Subject to any disclaimer, the term of this patent is extended or adjusted under 35 U.S.C. 154(b) by 366 days.

(21) Appl. No.: 12/659,707

(22) Filed: Mar. 18, 2010

(65) Prior Publication Data

US 2010/0247742 A1  Sep. 30, 2010

(30) Foreign Application Priority Data

Mar. 31, 2009  (CN) .......................... 2009 1 0130570
Nov. 4, 2009  (CN) .......................... 2009 1 0208357

(51) Int. Cl.
*B28B 17/00* (2006.01)

(52) U.S. Cl.
USPC ........... 425/375; 425/217; 425/169; 425/225; 425/90; 425/130; 264/308; 264/37.29

(58) Field of Classification Search
USPC ................. 425/174.4, 169, 375, 73, 74, 210, 425/225, 217, 90, 93, 216, 130, 215; 264/497, 264/308, 113, 37.29, 101; 118/712, 66, 602, 118/600, 308, 309, 313, 314, 315, 316; 222/409, 414, DIG. 1, 233, 238, 367, 361, 222/336, 354, 355; 700/119; 141/8, 98

See application file for complete search history.

(56) References Cited

U.S. PATENT DOCUMENTS

| | | | |
|---|---|---|---|
| 6,175,422 B1* | 1/2001 | Penn et al. | 358/1.1 |
| 6,896,839 B2* | 5/2005 | Kubo et al. | 264/460 |
| 2001/0050448 A1* | 12/2001 | Kubo et al. | 264/308 |
| 2002/0079601 A1* | 6/2002 | Russell et al. | 264/40.1 |
| 2004/0075196 A1* | 4/2004 | Leyden et al. | 264/401 |
| 2005/0280185 A1* | 12/2005 | Russell et al. | 264/308 |
| 2006/0141145 A1 | 6/2006 | Davidson et al. | |
| 2006/0204603 A1* | 9/2006 | Leuterer et al. | 425/174.4 |
| 2008/0111271 A1* | 5/2008 | Khoshnevis | 264/113 |

FOREIGN PATENT DOCUMENTS

| | | |
|---|---|---|
| CN | 2374286 Y | 4/2000 |
| CN | 101157089 A | 4/2008 |

\* cited by examiner

*Primary Examiner* — Yogendra Gupta
*Assistant Examiner* — Ninh Le
(74) *Attorney, Agent, or Firm* — Bacon & Thomas, PLLC

(57) ABSTRACT

A three-dimensional object forming apparatus is provided, which at least comprises: a construction stage, a printing module, plural temporary storage tanks, plural powder supplying tanks, a construction tank, a printing quality inspection component for forming a pattern to determine whether the printing module is blocked or not, a maintenance device, and a dust-proof device.

19 Claims, 38 Drawing Sheets

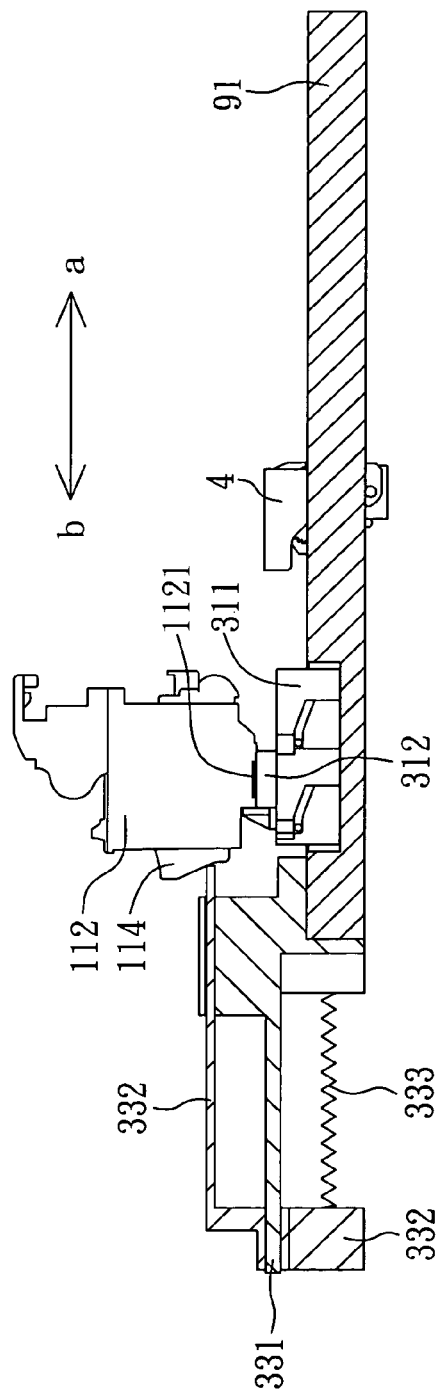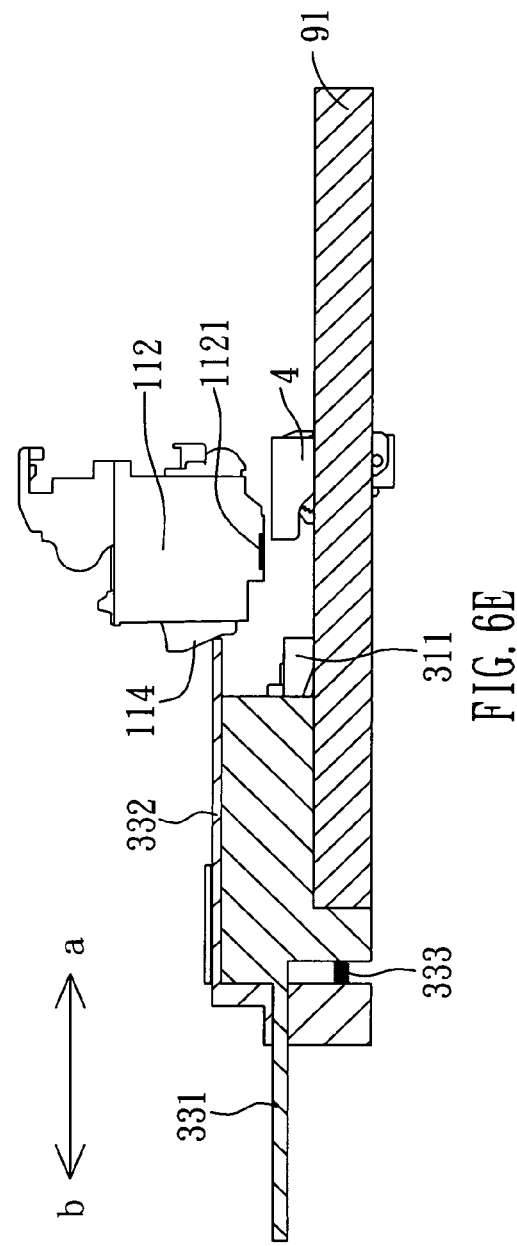
FIG. 6D
FIG. 6E

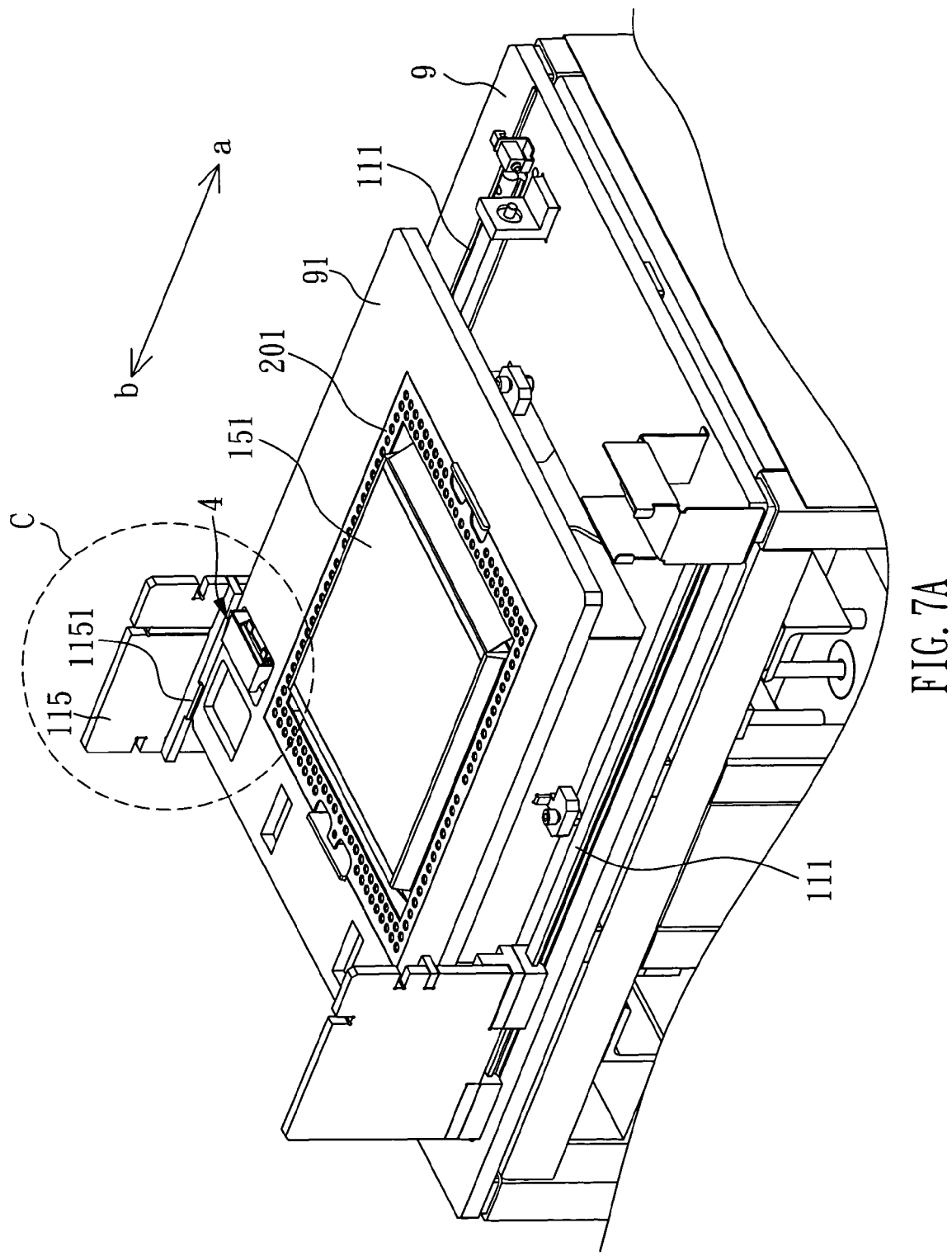

THREE-DIMENSIONAL OBJECT FORMING APPARATUS AND METHOD FOR FORMING THREE-DIMENSIONAL OBJECT

BACKGROUND OF THE INVENTION

1. Field of the Invention

The present invention relates to a three-dimensional object forming apparatus and, more particularly to a three-dimensional object forming apparatus and a method for forming a three-dimensional object.

2. Description of Related Art

Rapid prototyping (RP) is developed according to the concept of a laminating process for forming pyramids. The technical feature of the rapid prototyping is rapid shaping, and transforming designed programs with complex configurations into three-dimensional (3D) models automatically and rapidly without using any cutting tools, molds and fixtures. Hence, the rapid prototyping can greatly reduce the study times and the research costs of new products, and ensure the time-to-market and the first-time success rate of the new products. The rapid prototyping is a more complete and conventional tool of product design for technical personnel to introduce new products to other technical personnel and non-technical personnel such as an enterprise's decision makers and users. Therefore, it is possible to increase the competitiveness of the products on the market and the rapid response of enterprises to the market.

Currently, the rapid prototyping technique generates 3D models by combining printing techniques and precise positioning carrier techniques. The process comprises the following steps: spreading a layer of powder on a carrier, printing an adhesive with high viscosity on parts of the powder through an ink-jet printing process to make the adhesive and the powder stick together and solidify, and repeating the aforementioned steps to laminate layer by layer to obtain a 3D model.

However, the printing heads of the printing apparatus generally used in the rapid prototyping technique are not sealed, when the ink-jet printing process is not being carried out. Hence, the remaining adhesive may dry on the printing heads or in the storage tank. The dried adhesive residue may impair the subsequent operation of the printing apparatus, and hence the benefits of the system cannot be ensured.

The rapid prototyping technique is known as the fastest molding technique currently available. However, no matter what the mold's size is or how the apparatus is modified, several, even tens of hours are spent to obtain a 3D model. In addition, when the printing head is blocked and the blocked printing head is not found or determined timely during the process of lamination, significant amounts of time and materials are wasted.

Additionally, the printing rate of spraying the printing adhesive with high viscosity is 8 m/sec, during the process of spraying the printing adhesive to form the model. At the instant that the droplets of the printing adhesive adhere to the powder, the nano-sized powder grains not adhered to the droplets may float in the air due to turbulence arising from the high printing rate. Furthermore, during the process of powder supply and object formation, the powder may also circulate in the air when the lamination of the powder is delivered. Besides, the conventional apparatus does not comprise a quantitative powder supplying device, so the remaining powder have to be delivered back into the recycle tank. During delivering of the remaining powder, the powder may descend inappropriately, causing pollution as well as waste of energy. Furthermore, excessive time is spent after each powder spreading step and several hours have to be spent waiting for the completed model to dry. If the strength of the model is insufficient or the model is not taken out properly, damage may occur thereto. Hence, the durations of both the fabrication and drying processes are not satisfactory for the industry. Also, the single direction processes of powder spreading and printing can only be used herein, because the precision of the printing position cannot be achieved; therefore, the time of shaping is also increased due to the single direction processes.

In addition, when the apparatus is in a standby mode for a long time or the printing head is idle, the printing adhesive residue clogs the wipers and sealing units in the maintenance device, which is particularly aggravated by hardening of the adhesive. Also, the circulating powder generated in the processes of powder spreading or printing impair the functions of devices and components.

According to the conventional printing module using a single-direction powder spreading process and a single-direction printing process, the printing module supplies powder from the start side to the finish side, spreads those powder from the end side to the start side, and then prints from start side to the finish side. Therefore, the preparing time is too long, and the time for manufacturing models cannot be fully utilized.

Therefore, it is desirable to provide a three-dimensional object forming apparatus and a method for forming a three-dimensional object to obviate the aforementioned problems in the art.

SUMMARY OF THE INVENTION

The object of the present invention is to provide a three-dimensional object forming apparatus and a method for forming a three-dimensional object, which are able to solve the problems that the optimum seal cannot be achieved during inactivity of the three-dimensional object forming apparatus, the remaining adhesive becomes congealed on the printing head or in the storage tank, the condition of the blocked printing head cannot be determined timely, the dust-proofing effect cannot be achieved, the time for model shaping is too long, the printing adhesive adheres and hardens on the wipers and sealing units when the apparatus is in standby mode for a long time or the printing head is idle, and the preparing time is too long due to the single-direction powder spreading process and printing process, which causes excessive and unsatisfactory time consumption in the manufacturing of models.

To achieve the object, one general aspect of the present invention provides a three-dimensional object forming apparatus, which comprises: a construction stage, including a loading platform; a printing module, arranged and moved on the construction stage, and including at least one printing cartridge for spraying a liquid; at least one temporary storage tank arranged on a side of the printing module, wherein the at least one temporary storage tank is used for receiving powder and performing a powder spreading process quantitatively and in section in bi-direction; at least one powder supplying tank, arranged on a side of the construction stage to supply the powder; a construction tank with a construction platform inside, wherein the construction tank is used for loading the powder falling from the temporary storage tank, and the printing module sprays the liquid on the powder falling from the temporary storage tank; a printing quality inspection component, including a printing medium arranged on the loading platform of the construction stage, wherein the printing module forms a pattern on the printing medium, and the pattern is used to determine whether the printing module is blocked or not; a maintenance device, including a cover component, and a scraping component, wherein the cover component and the scraping component are respectively arranged on the loading platform of the construction stage; and a dust-proof device, including a dust-proof transmission portion structure, a dust-proof construction tank structure, a dust-proof maintenance device structure, a dust-proof working environment structure, a dust-proof storage tank structure, wherein the dust-proof device is used to prevent the pollution resulting from the powder circulating in the air during the powder spreading process and a printing process.

BRIEF DESCRIPTION OF THE DRAWINGS

FIG. 6D is a cross-sectional view showing the cover dust-proof component shown in FIG. 6C in an open status;

FIG. 6E is a cross-sectional view showing the cover dust-proof component shown in FIG. 6C in a closed status;

FIG. 7A is a perspective view showing a dust-proof cleaning component arranged in a three-dimensional object forming apparatus of the present invention;

DETAILED DESCRIPTION OF THE PREFERRED EMBODIMENT

Hereinbelow, the present invention will be described in detail with reference to Embodiments. The present invention may, however, be embodied in many different forms and should not be construed as being limited to the Examples set forth herein. Rather, these Embodiments are provided to fully convey the concept of the invention to those skilled in the art.

Figure 1A:
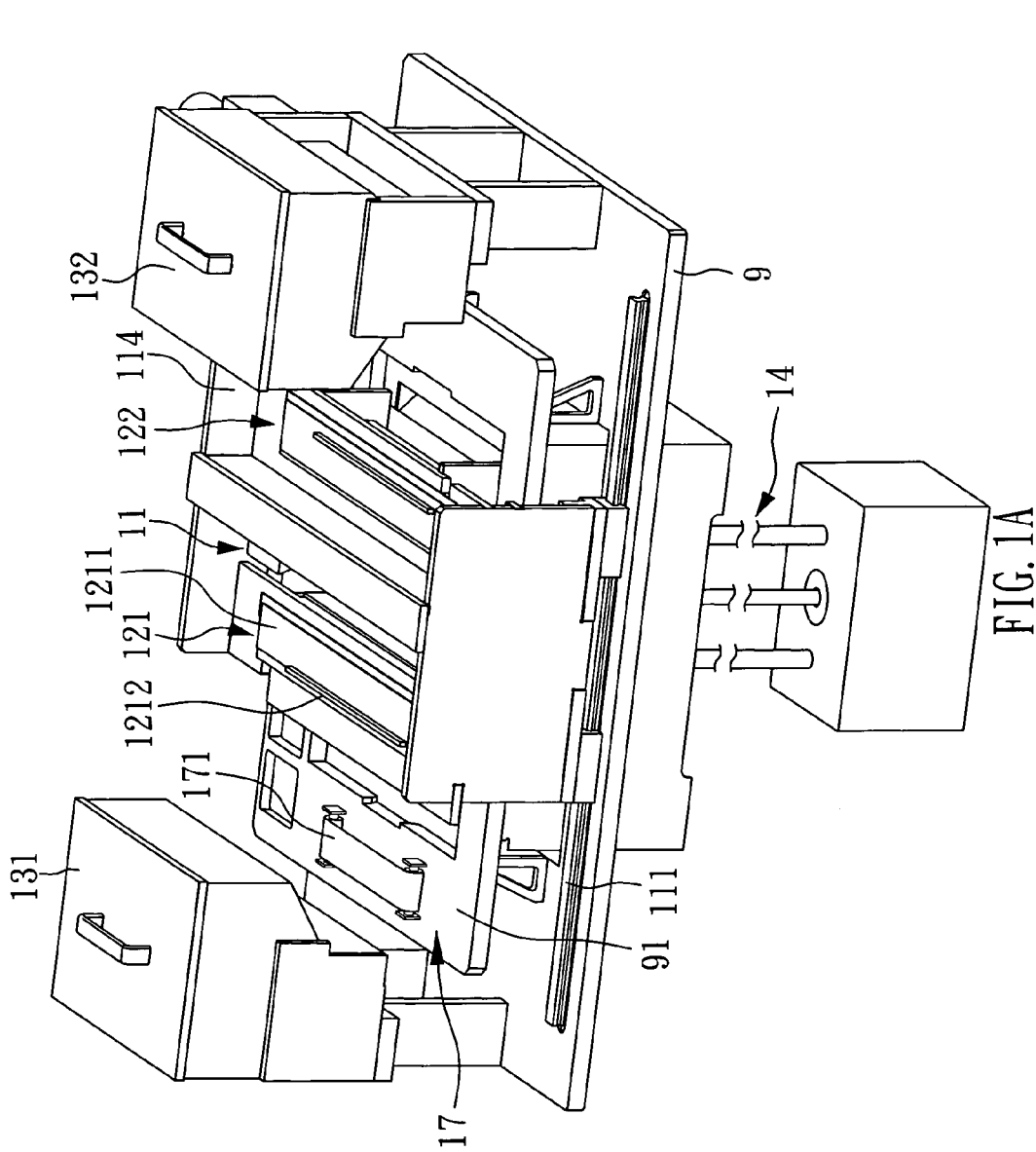
FIG. 1A is a perspective view of a three-dimensional object forming apparatus of a preferred embodiment of the present invention.
Figure 1B:
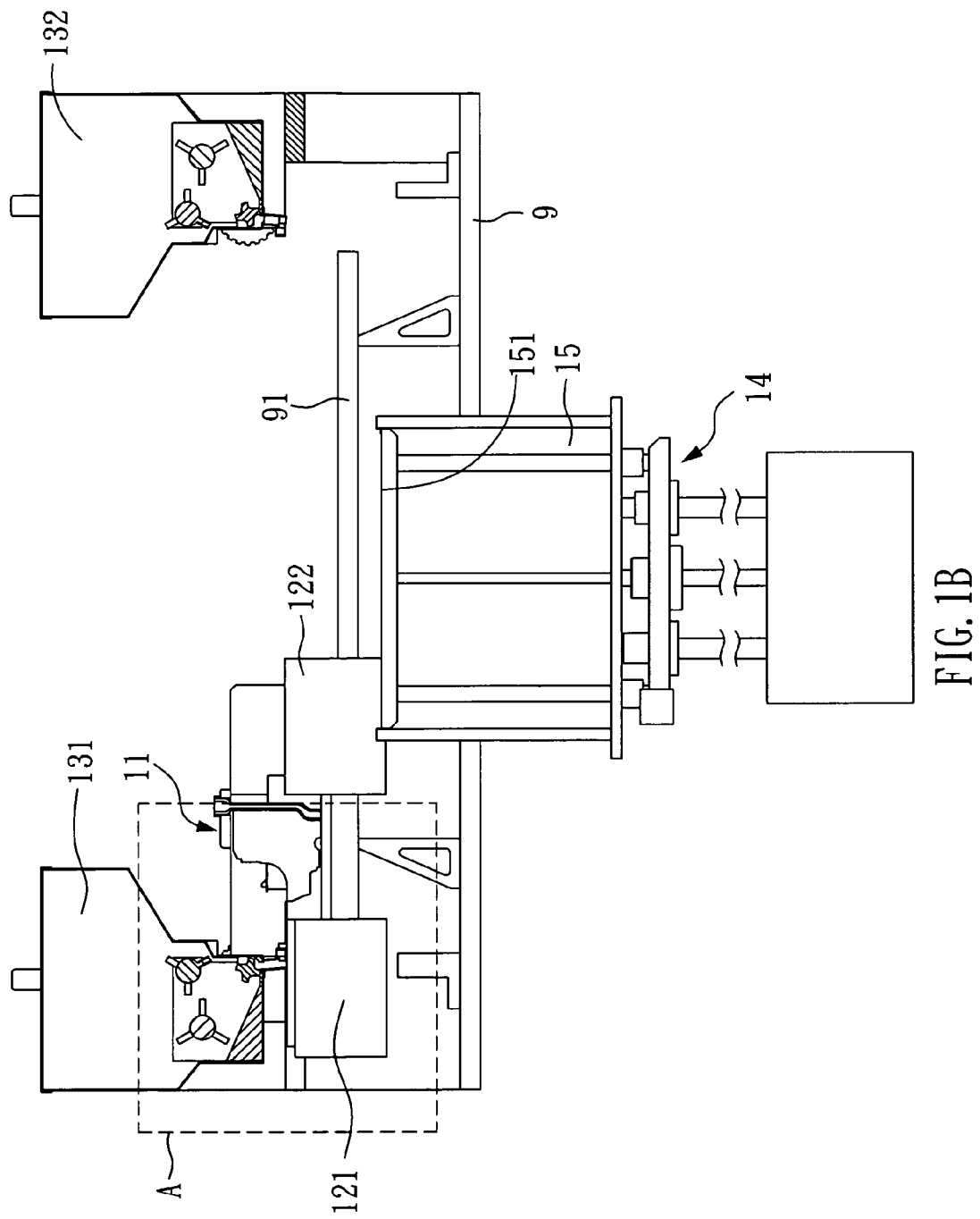
FIG. 1B is a cross-sectional view of FIG. 1A.

FIG. 1A is a perspective view of a three-dimensional object forming apparatus of a preferred embodiment of the present invention, and FIG. 1B is a cross-sectional view of FIG. 1A. As shown in FIG. 1A, according to the three-dimensional object forming apparatus 1 of the present invention, a printing module 11, plural temporary storage tanks, plural powder supplying tanks, a lift installation 14, and a construction tank 15 (as shown in FIG. 1B) are arranged on a construction stage 9 with a loading platform 91.

As shown in FIG. 1B, the inner part of the construction tank 15 connects to partial components of the lift installation 14, so the construction tank 15 can move upward and downward. In addition, the construction tank 15 further comprises a construction platform 151 inside, on which the to-be-laminated object forms. The construction platform 151 connects and positions to the lift installation 14, so the lift installation 14 can drive the construction platform 151 to move upward and downward inside the construction tank 15.

As shown in FIG. 1A, plural powder supplying tanks may comprise two powder supplying tanks 131, 132, which are respectively arranged on the left side and the right side of the three-dimensional object forming apparatus 1, and provide powder for generating 3D objects. In addition, plural temporary storage tanks may comprise two temporary storage tanks 121, 122, which are respectively arranged on the left side and the right side of a printing module 11, and move with the printing module 11. The powder supplying tank 131 and the temporary storage tank 121 match with each other and are arranged on the same side, and the powder supplying tank 131 provide powder to the temporary storage tank 121 for the sequential powder spreading process. Besides, the powder supplying tank 132 and the temporary storage tank 122 also co-operate with each other and are arranged on the same side, and the powder supplying tank 131 provides powder to the temporary storage tank 121 for the sequential powder spreading process. Therefore, a powder spreading process operating in bi-direction can be achieved sequentially.

Figure 1C:
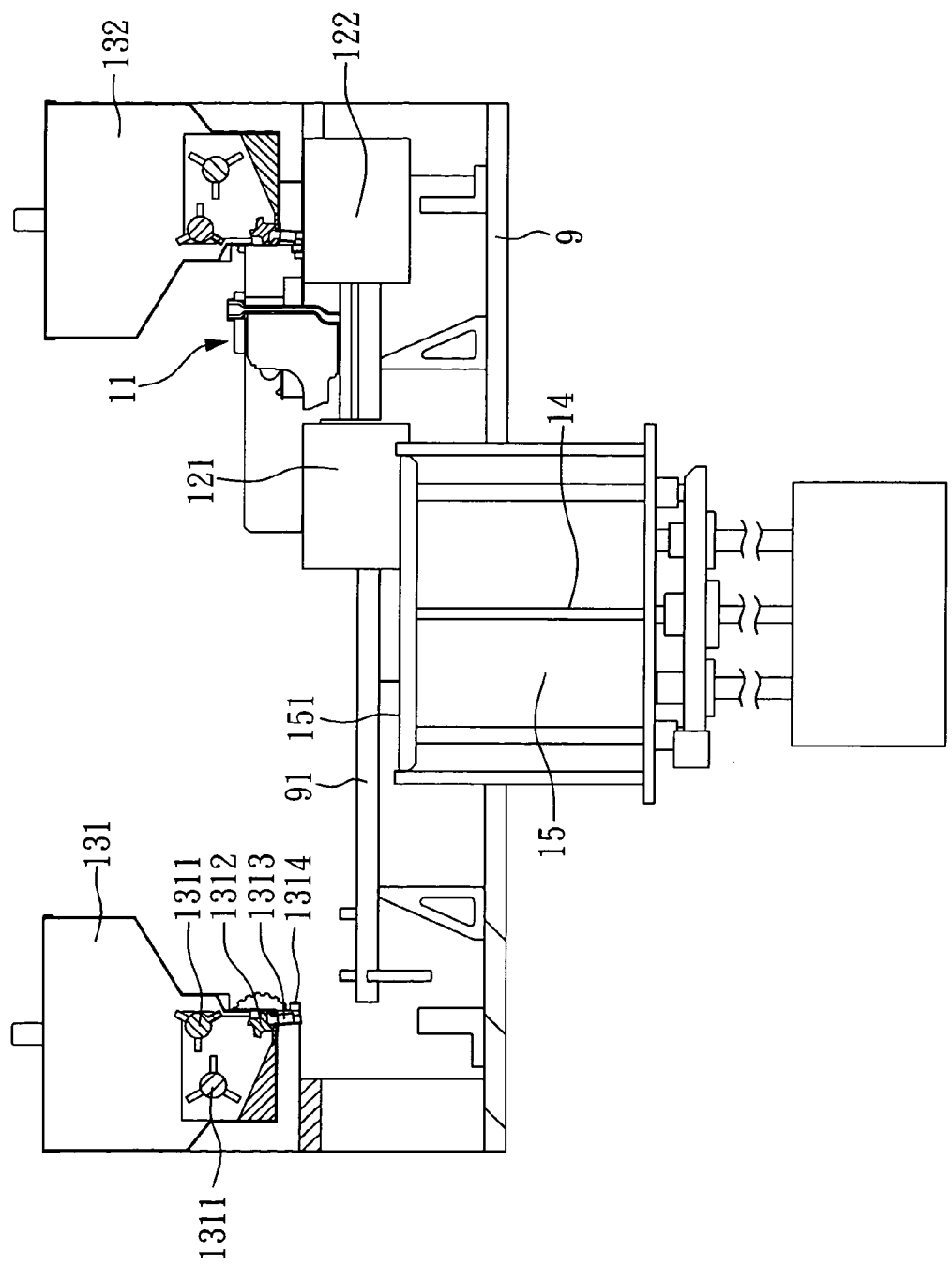
FIG. 1C is a perspective view showing a printing module in FIG. 1B moving to the right side.
Figure 12:
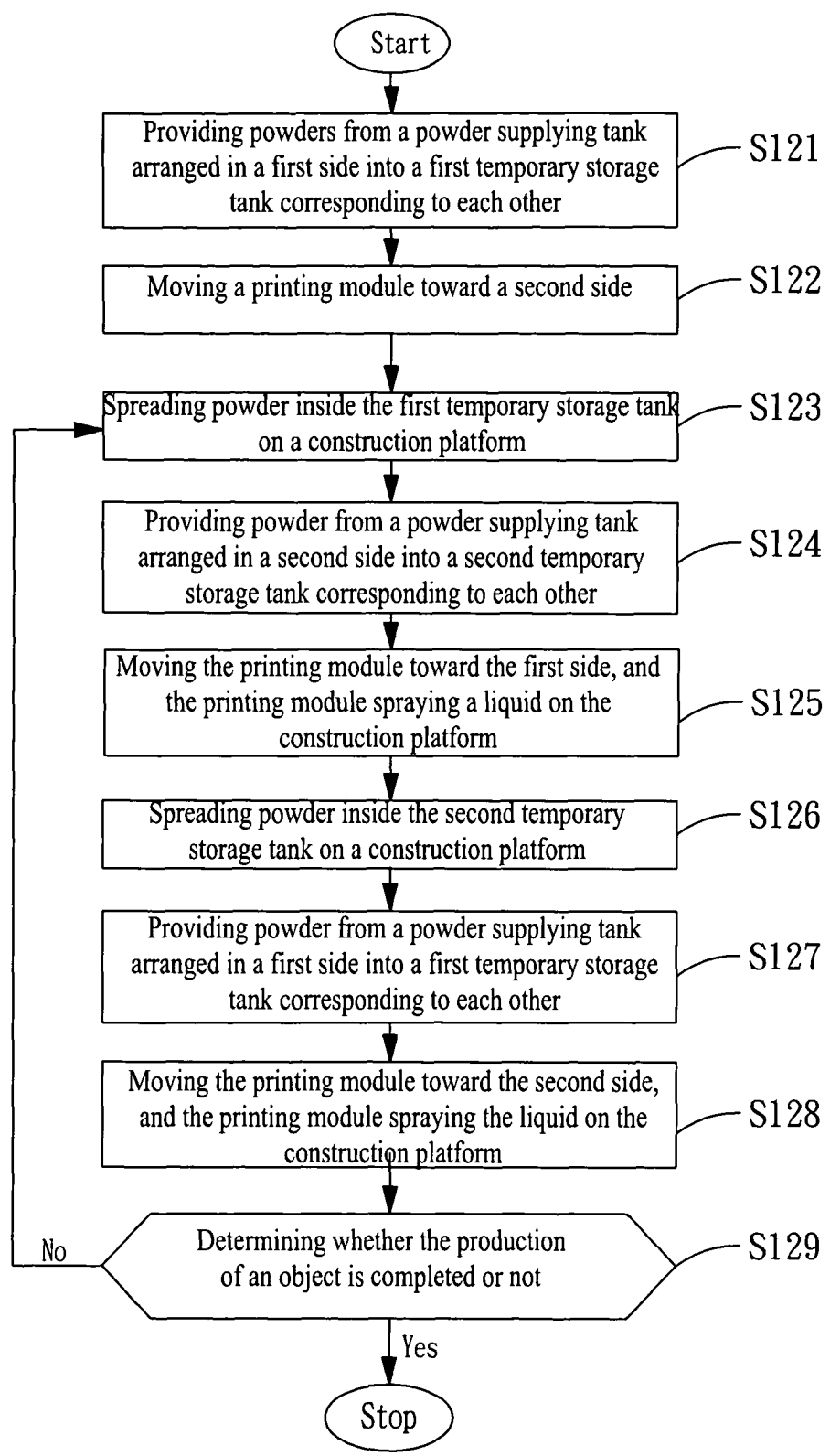
FIG. 12 is a flow-chart showing the steps for shaping of a 3D object by use of a three-dimensional object forming apparatus of the present invention.

The preferred embodiment of the present invention illustrates the process that the printing module 11 moves from a first side to a second side to form a 3D object for example, but the present invention is not limited to this process. Herein, the first side is the left side of FIG. 1A, and the second side is the right side of FIG. As shown in FIG. 1B and FIG. 12, the operation of the three-dimensional object forming apparatus 1 of the present invention comprises the following steps. First, when the powder supplying tank 131 matches with the temporary storage tank 121, the powder supplying tank 131 provides powder 16 with an amount for spreading on the entire surface of the construction platform 151 into the temporary storage tank 121, as shown in the step 121 and FIG. 1D. After the powder supplying process has been completed, the printing module 11 drives the temporary storage tank 121 moving from the left side to the right side (step S122), and then the powder 16 inside the temporary storage tank 121 are spread on the surface of the construction platform 151 (step S123) during the movement of the temporary storage tank 121. When the temporary storage tank 121 has moved to the right side (as shown in FIG. 1C), the powder supplying tank 132 matches with the temporary storage tank 122, and the powder supplying tank 132 also provides powder 16 with an amount for spreading on the entire surface of the construction platform 151 into the temporary storage tank 122 (step S124). After the powder supplying process has been completed, the printing module 11 moves to the left side, and sprays a liquid containing an adhesive with high viscosity on parts of the powder 16, which have been already spread on the construction platform 151, through a printing process, and the liquid adheres to the powder 16 and becomes solidified (step S125). Then, the temporary storage tank 122 arranged on the right side of the printing module 11 spreads a further layer of powder 16 on the powder 16 that the liquid has already thereon (S126). When the printing module 11 moves to the left side and the powder supplying tank 131 matches with the temporary storage tank 121 again, the powder supplying tank 131 provides powder into the temporary storage tank 121 again (S127). Then, the printing module 11 drives the temporary storage tank 121 to move from the left side to the right side, and sprays a liquid containing an adhesive with high viscosity on parts of the powder 16 through a printing process, and the liquid adheres to the powder 16 and solidifies (step S128). After the aforementioned steps, the software of the three-dimensional object forming apparatus 1 determines whether the process of manufacturing the 3D object is finished or not. If the determined result shows finished, the process is stopped, whereafter the lift installation 14 drives the construction platform 151 moving upward and the redundant powder drop 16 being removed, and a 3D object is obtained.

On the other hand, if the determined result shows the process is unfinished, the temporary storage tank 122 arranged on the right side of the printing module 11 spreads a further layer of powder 16 on the powder 16 with the liquid already thereon, and the aforementioned steps S123 to S128 are repeated to obtain a 3D object, i.e. a 3D model. However, according to the conventional apparatus using the single direction processes of powder spreading and printing, the single direction printing module spreads powder from the start side to the end side, then spreads powder from the end side to the start side, and finally prints from the start side to the finish side. Hence, the conventional apparatus has the problem that the production time is too long and is impractical.

Figure 1D:
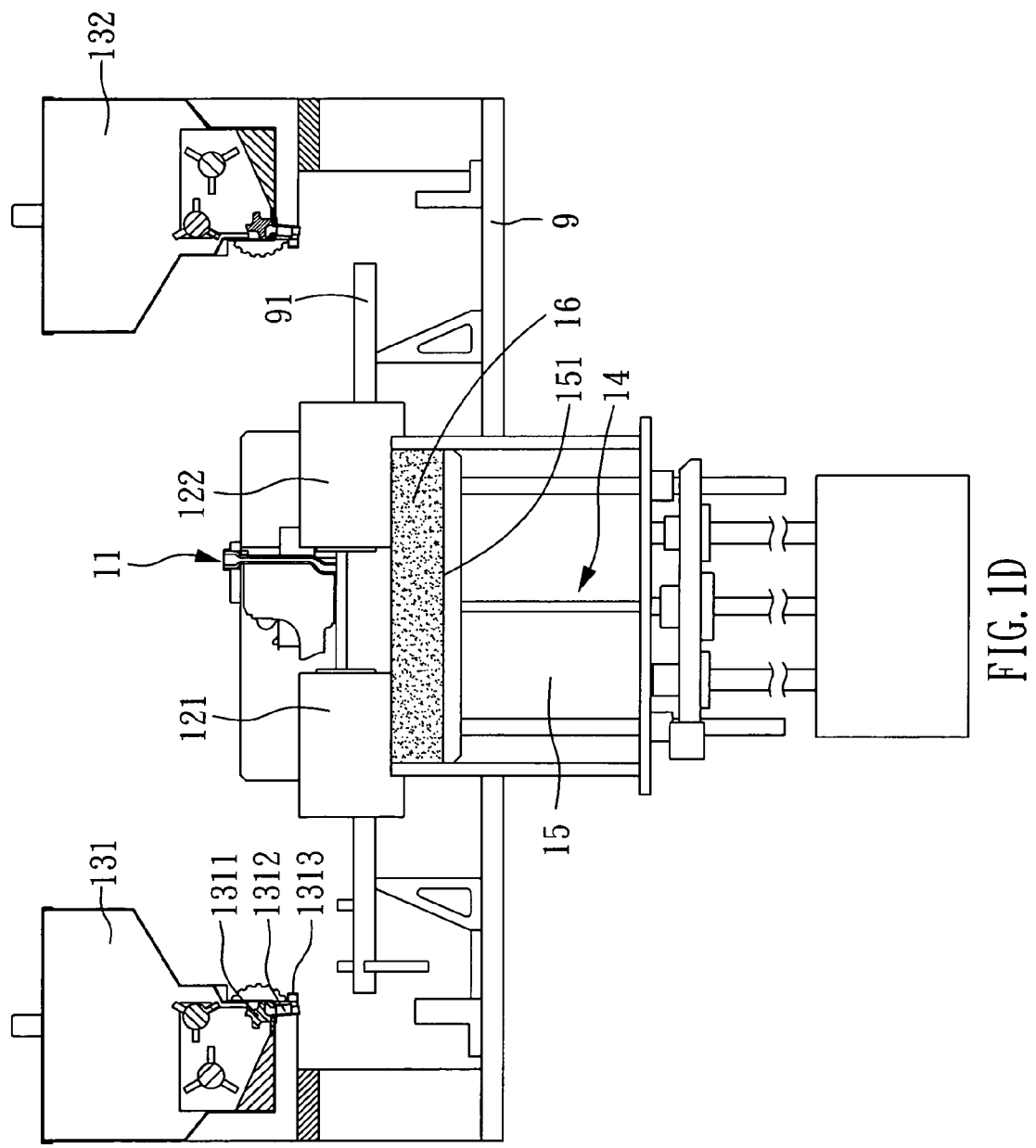
FIG. 1D is a perspective view of a lift installation shown in FIG. 1B.

In addition, after the printing module 11 sprays a layer of powder each time or generates layers of powder with a certain thickness, the lift installation 14 drives the inner of the construction platform 151 downward (as shown in FIG. 1D), and then the printing module 11 matches with the temporary storage tank 121, 122 to spread powder to generate a 3D object. After the whole object has been formed, the lift installation 14 drives the construction platform 151 moving upward and the redundant powder 16 being removed, and a 3D object is obtained.

Figure 1E:
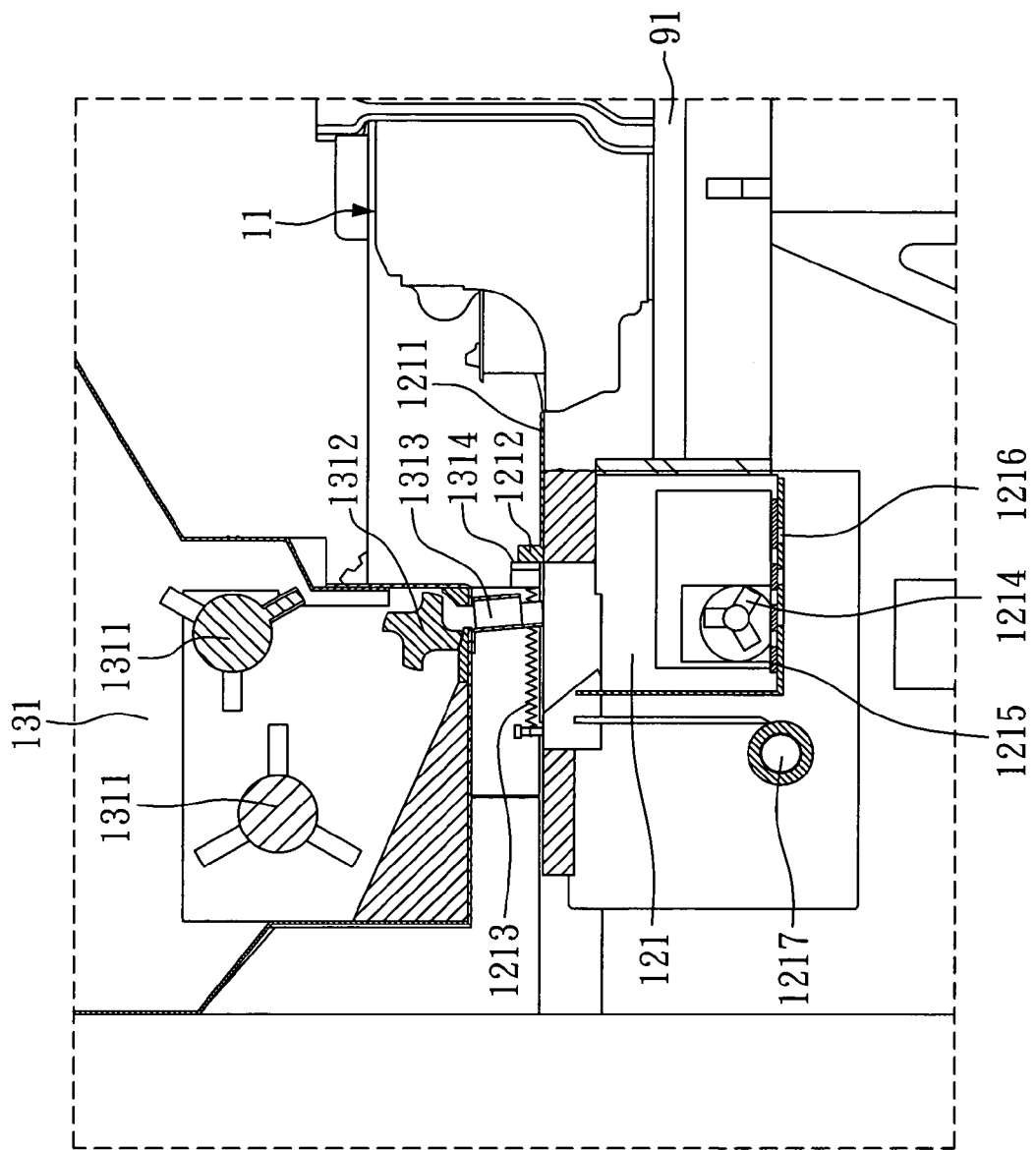
FIG. 1E is an enlarged perspective view of a region A in FIG. 1B.

FIG. 1E is an enlarged perspective view of a region A in FIG. 1B. As shown in FIG. 1E, FIG. 1A, and FIG. 1B, plural rollers are arranged inside the powder supplying tank 131, i.e. a set of first rollers 1311 and a set of second rollers 1312. The first rollers 1311 agitate the powder inside the powder supplying tank 131. The second rollers 1312 are quantitative rollers, which are used to quantitatively supply the powder 16 into the temporary storage tank 121 with an amount for spreading on the entire surface of the construction platform 151.

Referring to FIG. 1A and FIG. 1E, a cap 1211, which can move left and right, is arranged over the temporary storage tank 121. The cap 1211 connects to the body of the temporary storage tank 121 through an elastic element 1213. In present embodiment, the elastic element 1213 is a spring. In addition, the edge of the cap 1211 has a protrusion part 1212.

As shown in FIG. 1C and FIG. 1E, a route-leading unit 1313 and a blocking element 1314 are further arranged over the temporary powder supplying tank 121. When the temporary storage tank 121 connects to the powder supplying tank 131, the blocking element 1314 pushes the cap 1211 of the temporary storage tank 121 to open the temporary storage tank 121 horizontally. Hence, the powder supplying tank 131 can deliver powder 16 to the powder supplying tank 131 through the route-leading unit 1313, so the distance between the temporary storage tank 121 and the powder supplying tank 131 can be reduced to decrease the probability that the powder circulate in an undesired manner.

As shown in FIG. 1E, after the powder supplying process of the powder supplying tank 131 is completed, the printing module 11 drives the temporary storage tank 121 to the right side and distant from the powder supplying tank 131. At this moment, the blocking element 1314 no longer pushes the protrusion part 1212 of the cap 1211 of the temporary storage tank 121, and the cap 1211 closes the temporary storage tank 121 through the elastic recovery force of the elastic element 1213, as shown in FIG. 1A.

Figure 1F:
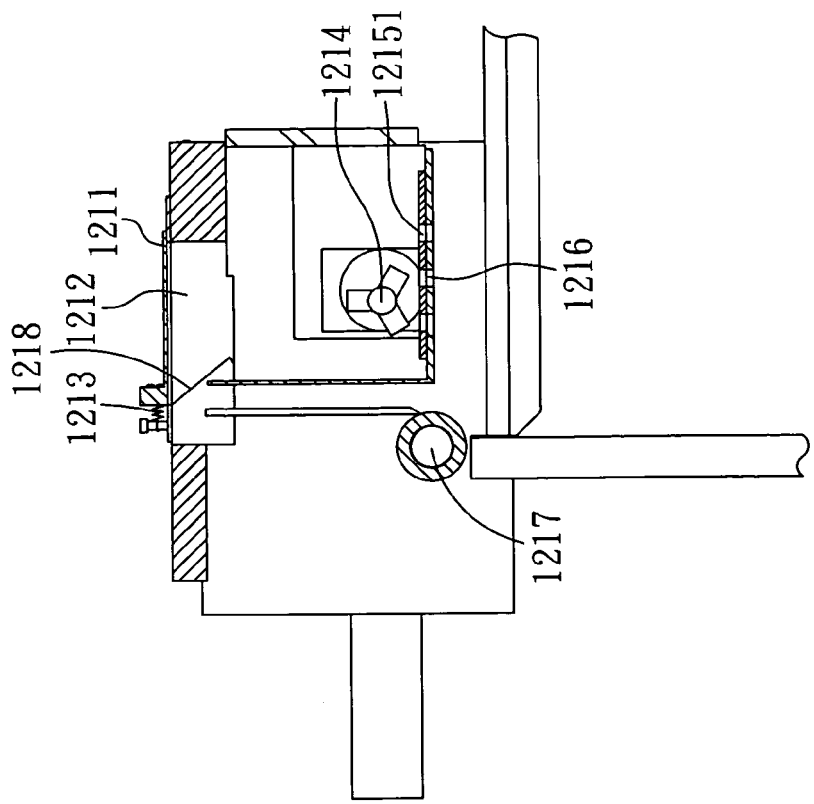
FIG. 1F is a perspective view showing notches of a plate unit of a temporary storage tank in FIG. 1E not aligning to openings of a bottom.
Figure 1G:
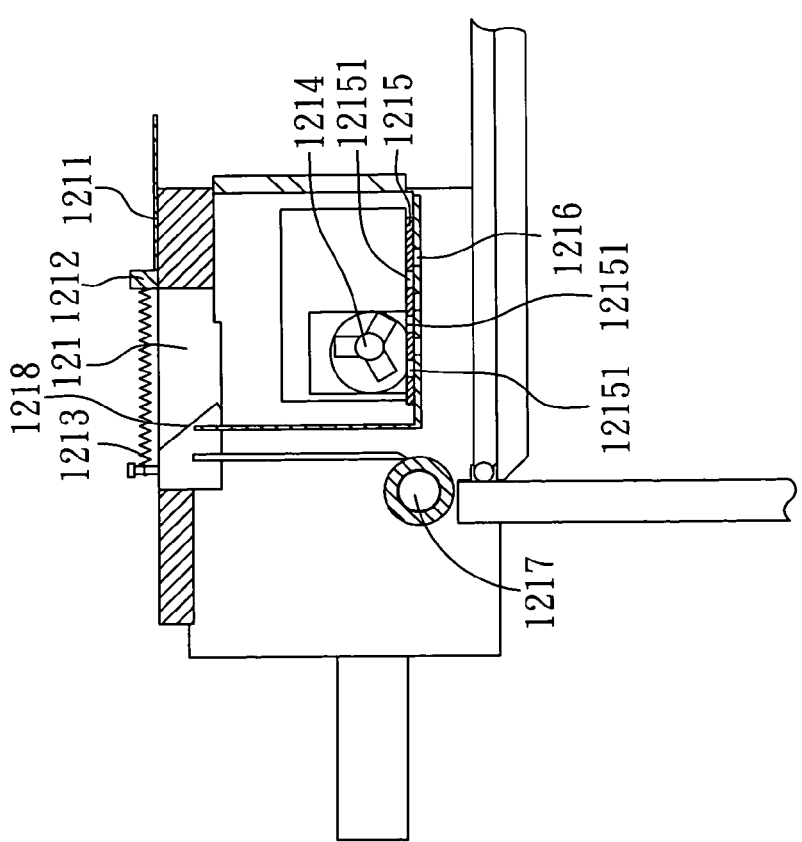
FIG. 1G is a perspective view showing notches of a plate unit of a temporary storage tank in FIG. 1E aligning to openings of a bottom.
Figure 1H:
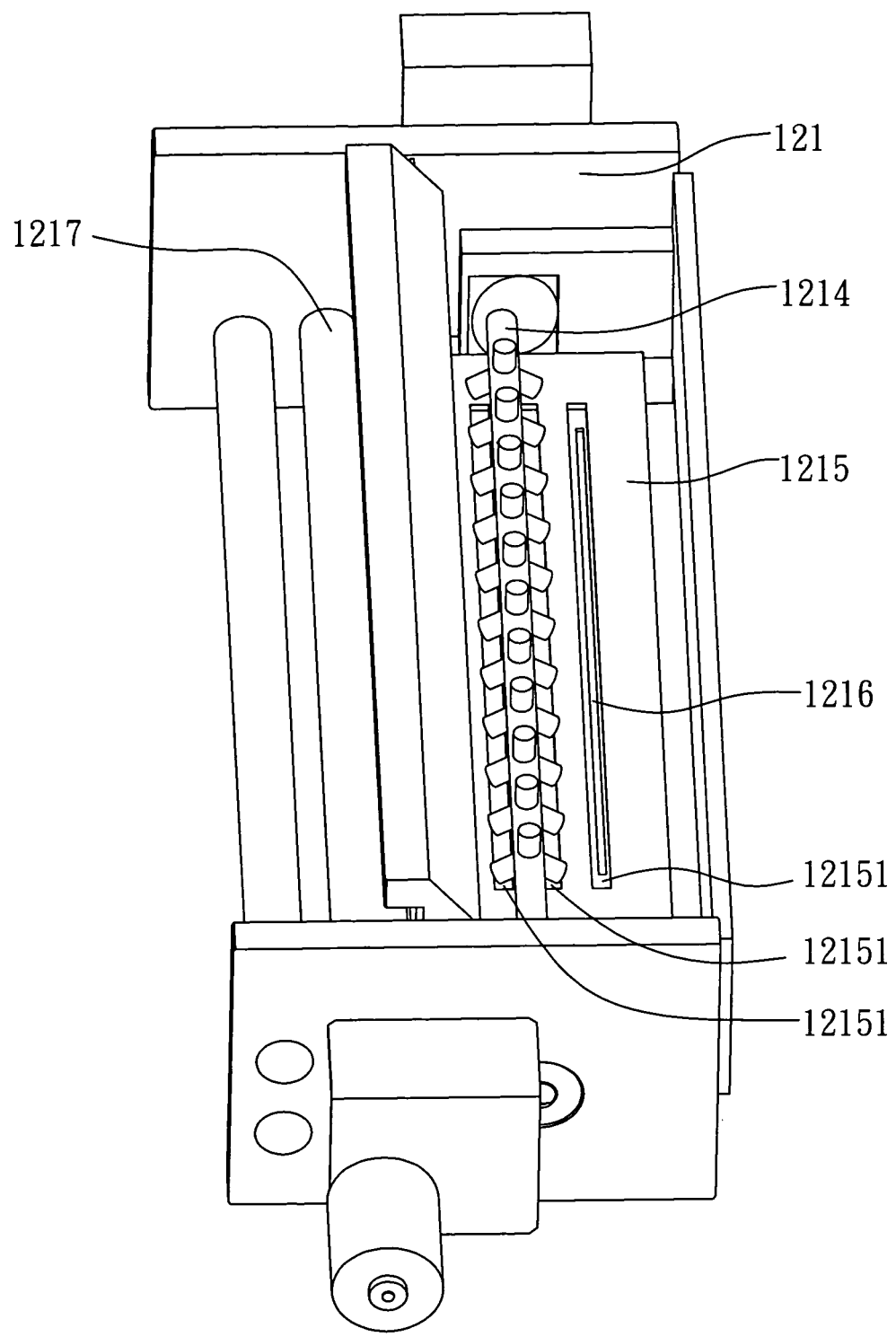
FIG. 1H is a perspective view showing a cap of a temporary storage tank in an open state.

FIG. 1F is a perspective view showing notches of a plate unit of a temporary storage tank in FIG. 1E not aligning to openings of a bottom, and FIG. 1H is a perspective view showing a cap of a temporary storage tank in an open state. As shown in FIG. 1F and FIG. 1H, a driving unit is arranged inside the temporary storage tank 121, wherein the driving unit may be an eccentric wheel 1214, which is used to drive the plate units 1215 with plural notches 12151. In addition, the area that the bottom of the temporary storage tank 121 corresponds to the plate unit 1215 is arranged with plural openings 1216, and the openings 1216 are arranged separately and horizontally. When the cap 1211 of the temporary storage tank 121 is open to perform the powder spreading process, the eccentric wheel 1214 drives the plate unit 1215 to disconnect the notches 12151 with the openings 1216. Hence, it is possible to prevent powder leaking out. When the cap 1211 of the temporary storage tank 121 is closed, the eccentric wheel 1214 drives the plate unit 1215 to connect the notches 12151 with the openings 1216, as shown in FIG. 1G. Therefore, the powder inside the temporary storage tank 121 falls to the construction platform 151 through the driving of the printing module 11, and a back roller 1217 pushes and presses on the powder to make the powder spread on the surface of the construction platform 151 uniformly.

Figure 2A:
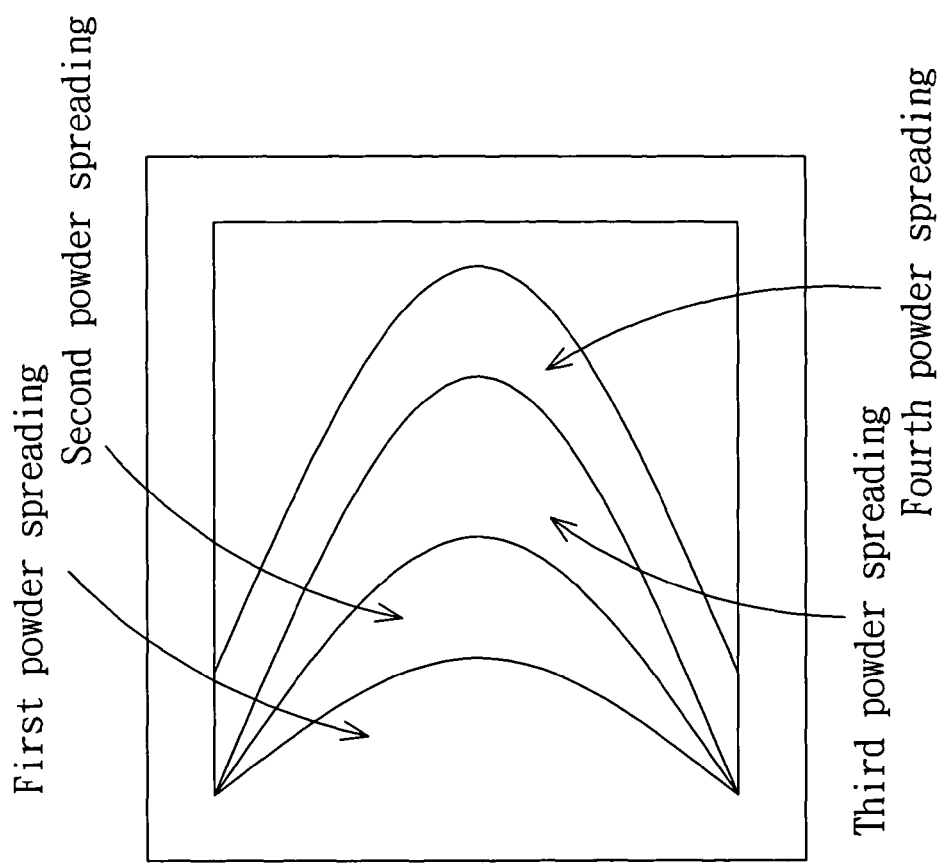
FIG. 2A is a perspective view showing a process of powder supply in the art.
Figure 2B:
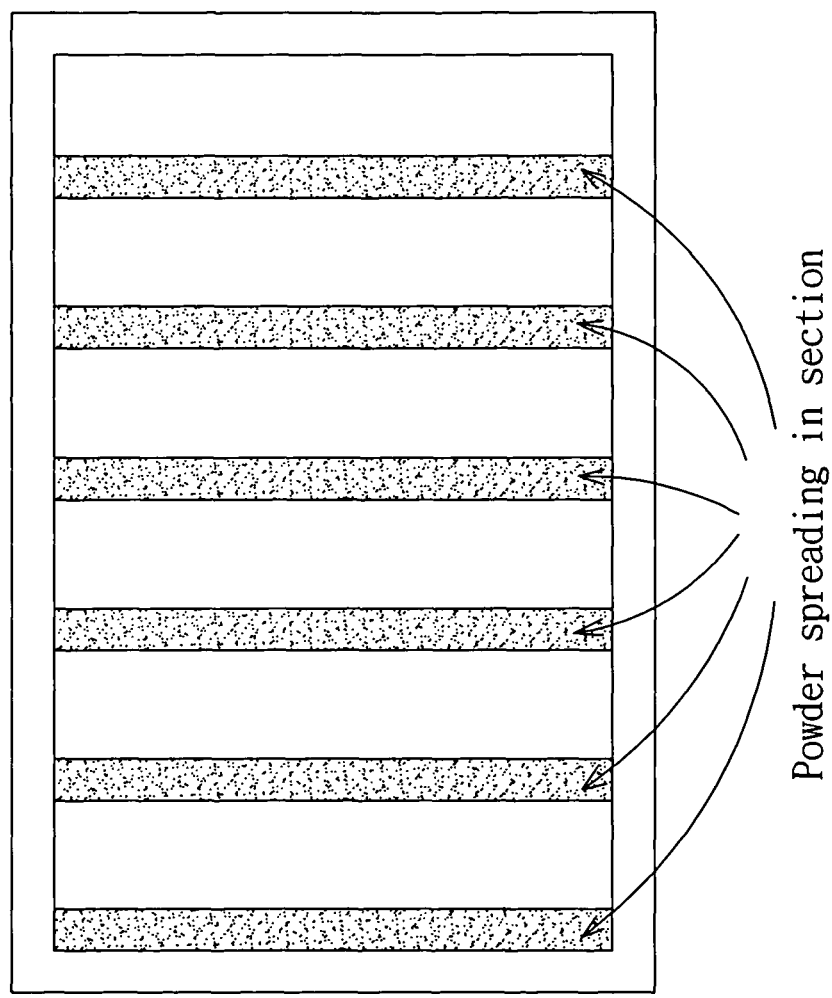
FIG. 2B is a perspective view showing that a temporary storage tank of the present invention spreads powder in section on a construction platform.

As shown in FIG. 1F and FIG. 1H, the notches 12151 on the plate unit 1215 are arranged separately and horizontally, so it is possible to spread powder on the construction platform 151 in section, as shown in FIG. 2B. Hence, the spreading density of the powder on the construction platform 151 is uniform. However, according to the conventional apparatus, all of the powder are spread at one time in the beginning, so the spreading density of the powder is not uniform, and redundant powder are pushed back to the recycle tank, as shown in FIG. 2A. When the amount of the powder is insufficient or too much, the powder may gather in the central part, so the density of the powder is not uniform. Hence, the density of the powder is greater in the front end, but fewer powder are powderspread on the two sides of the construction platform. Thus, the powder spreading process has to be performed many times to spread powder on the two sides of the construction platform. Therefore, when the conventional apparatus is used, the problems of the non-uniform density of the powder, the waste of the powder, the waste of the time, and the multi-times operation of the powder spreading process may be caused.

The method for matching the powder supplying tank 132 with the temporary storage tank 122 and the structures thereof are the same as those shown in FIG. 1E, FIG. 1F, FIG. 1G, and FIG. 1H, so the descriptions are omitted here.

Figure 3:
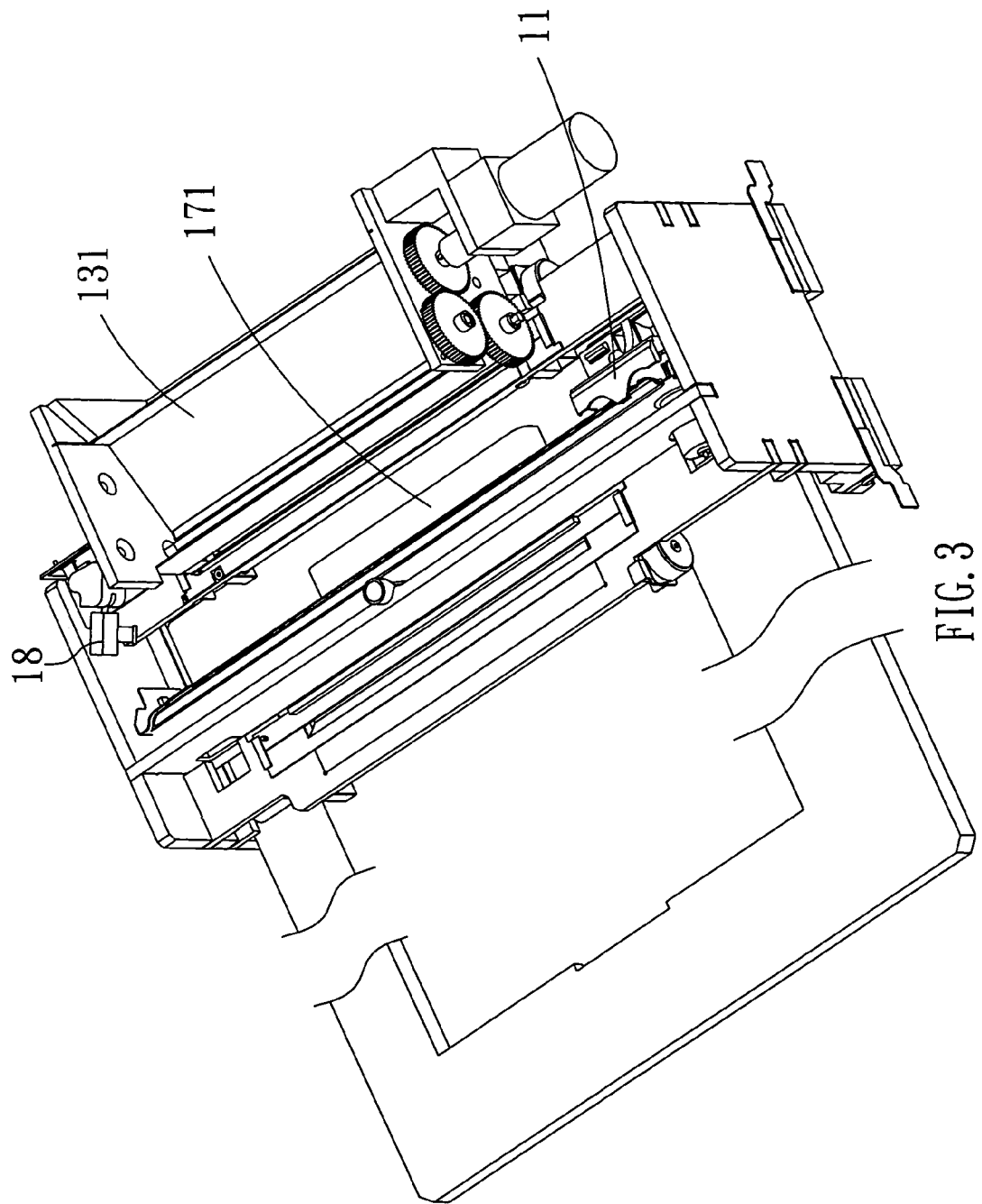
FIG. 3 is a perspective view showing a partial structure of a three-dimensional object forming apparatus in FIG. 1A.
Figure 7B:
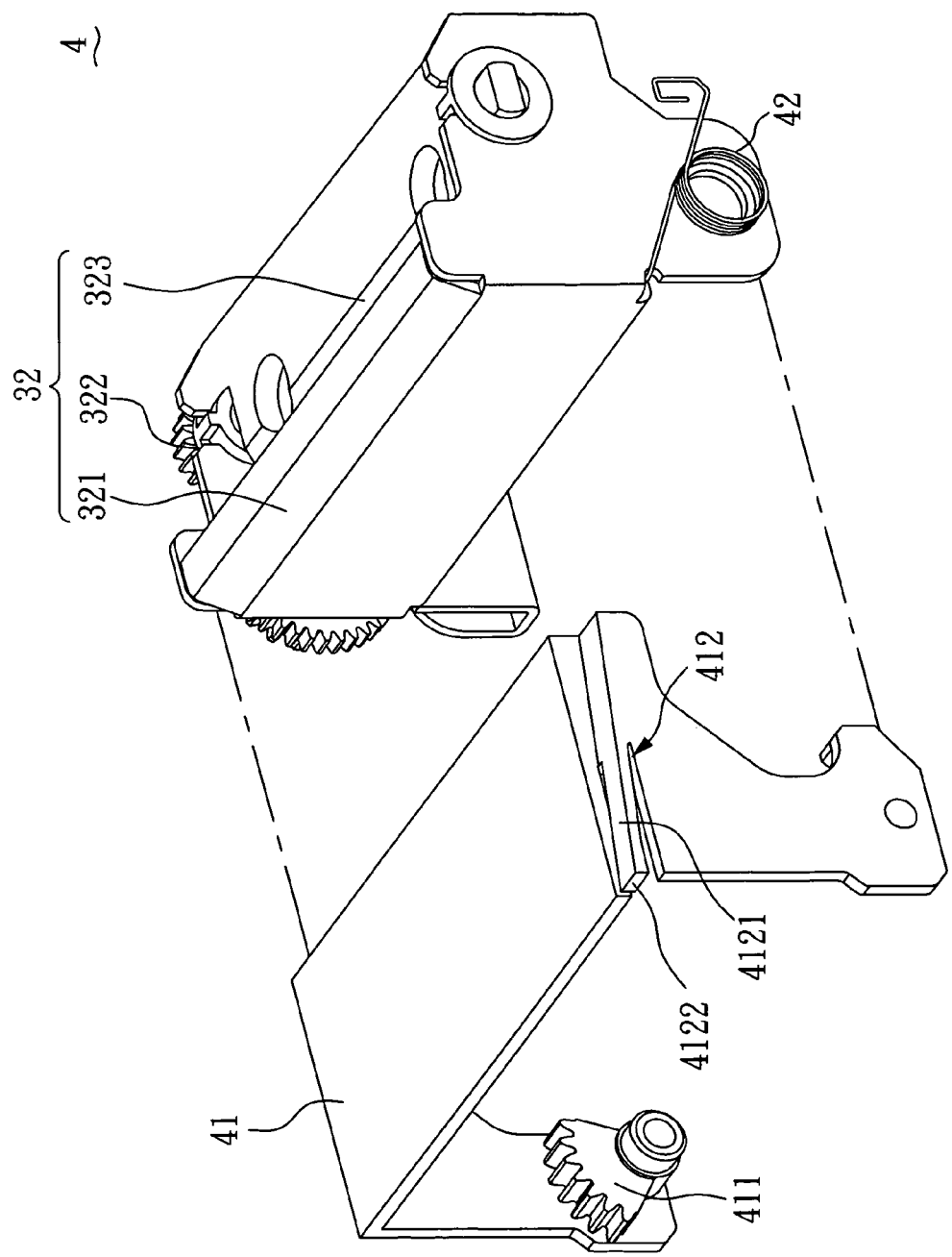
FIG. 7B is a perspective view showing the relationship between a scraping component and a dust-proof cleaning component in FIG. 7A.

FIG. 3 is a perspective view showing a partial structure of a three-dimensional object forming apparatus in FIG. 1A. As shown in FIG. 1A and FIG. 3, the three-dimensional object forming apparatus 1 further comprises a printing quality inspection component 17 and an image detection component 18. The printing quality inspection component 17 includes a printing medium arranged on the loading platform 91 of the construction stage 9, and the printing medium may be made of paper 171 or frosted glass (not shown in the figure). In the present embodiment, before the beginning of the printing process, the printing module 11 prints on the paper 171, which can be rolled through a driving device, to form a pattern. Then, the image detection component 18 arranged on the side of the powder supplying tank 131 detects the pattern to determine whether the printing head 1121 of the printing module 11 is blocked or not, as shown in FIG. 7F. The example of the image detection component 18 can be a charge-coupled device (CCD). If the determined result shows that the printing head 1121 is blocked, a cleaning process is performed on the printing module 11. If the determined result shows that the printing head 1121 is not blocked, the printing quality inspection component 17 winds the paper 171 to replace the paper 171 having the pattern formed thereon with a further paper 171 having a clean surface. Then, the printing module 11 performs the sequential printing process on the construction platform 151. On the other hand, a frosted glass with a flat face and a textured face can be used to replace the paper 171. The frosted glass is arranged on the construction stage 9, and a pattern can be printed on the textured face of the frosted glass. A sprayed liquid fills concavities in the textured face, whereby the textured face becomes as smooth as the flat face. When light is transmitted through the frosted glass, a regular refraction is generated. Hence, after a printing module has formed a pattern on the frosted glass, the image detection component 18 can detect the pattern to determine whether the printing head 1121 of the printing module is blocked or not. The effect of using the frosted glass is better than that using the paper 171.

Figure 4A:
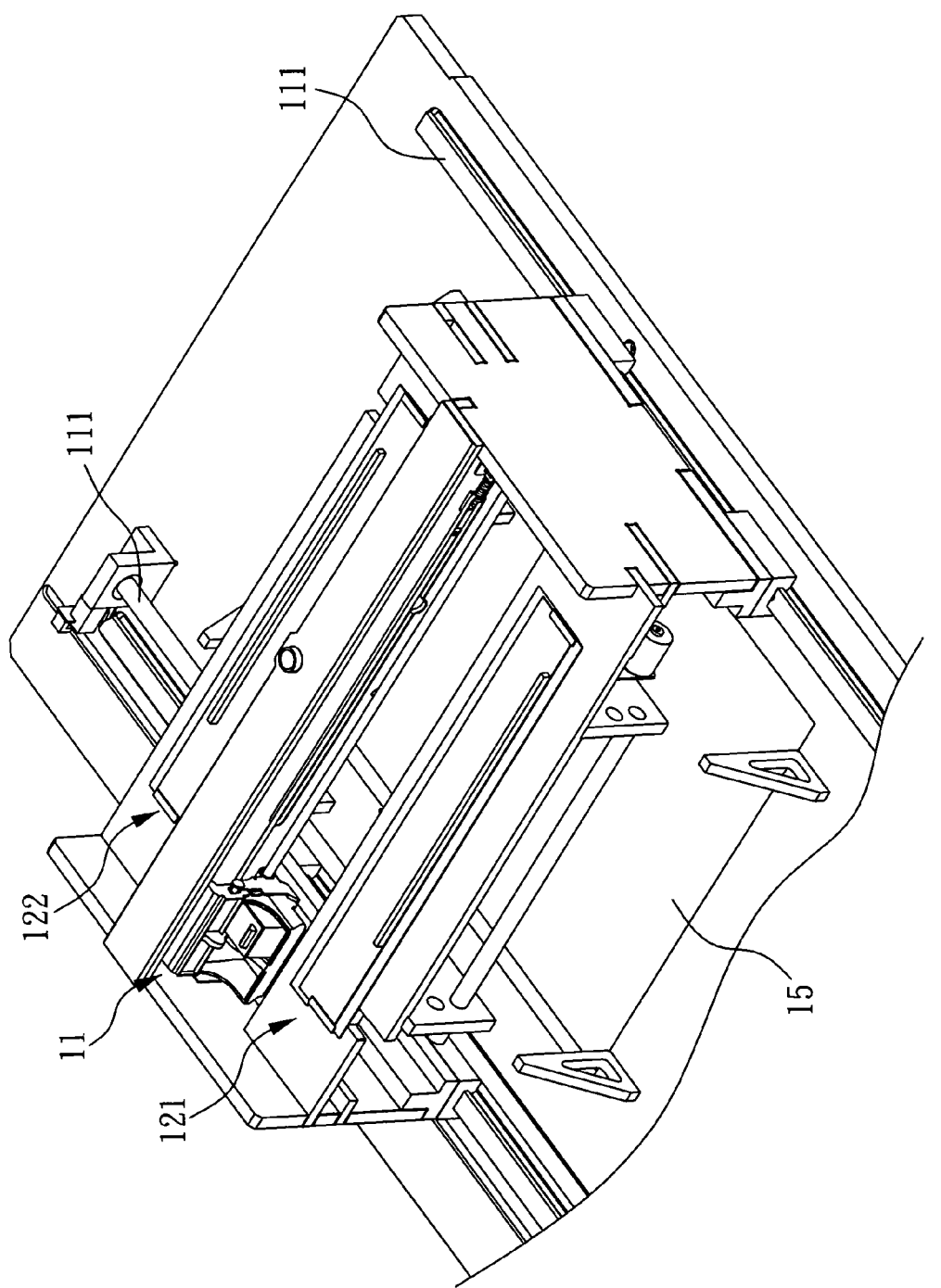
FIG. 4A is a perspective view showing a partial structure of a printing module of the present invention.

FIG. 4A is a perspective view showing a partial structure of a printing module of the present invention. As shown in FIG. 4A, the three-dimensional object forming apparatus 1 may further comprise a transmission portion 111, which extends over two sides of the printing module 11. The example of the transmission portion 111 can be a ball lead screw, and a linear slide. The function of the transmission portion 111 is to drive the printing module 11.

Figure 4B:
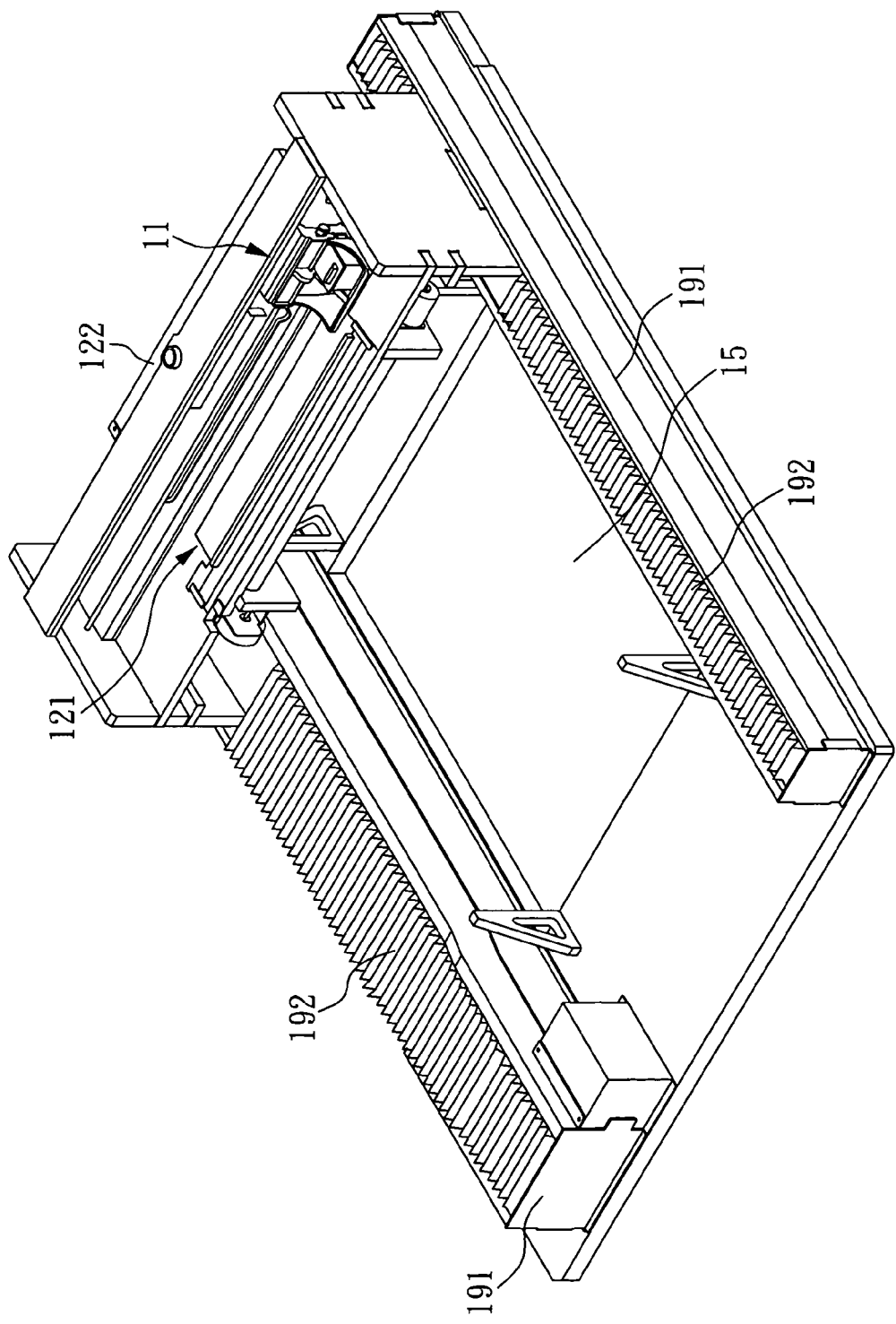
FIG. 4B is a perspective view showing a transmission portion dust-proof structure arranged on a transmission portion in FIG. 4A.

In order to prevent the circulating powder generated in the printing process adhering to the transmission portion 111 and causing the lifespan and the printing precision to decrease, the dust-proof transmission portion structure arranged on the three-dimensional object forming apparatus 1 of the present invention comprises: a dust-proof plate unit 191 and a telescopic dust-proof tube 192 (as shown in FIG. 4B). Herein, the dust-proof transmission portion structure is used to separate the transmission portion 111 from the environment with circulating powder, to ensure the transmission portion 111 is isolated from dust. Herein, the dust-proof plate unit 191 may be an iron means, which wraps around the transmission portion 111. In addition, the dust-proof plate unit 191 not only can separate the powder from the transmission portion 111, but also can serve as a route for the telescopic dust-proof tube 192. When the printing module 11 moves to the left side, the left part of the telescopic dust-proof tube 192 may be pressed by the printing module 11 and contract, and the right side of the telescopic dust-proof tube 192 may extend. On the other hand, when the printing module 11 moves to the right side, the right part of the telescopic dust-proof tube 192 may be pressed by the printing module 11 and contract, and the left side of the telescopic dust-proof tube 192 may extend. Thus, the purpose of separating the transmission portion 111 from the powder can be achieved.

Figure 5A:
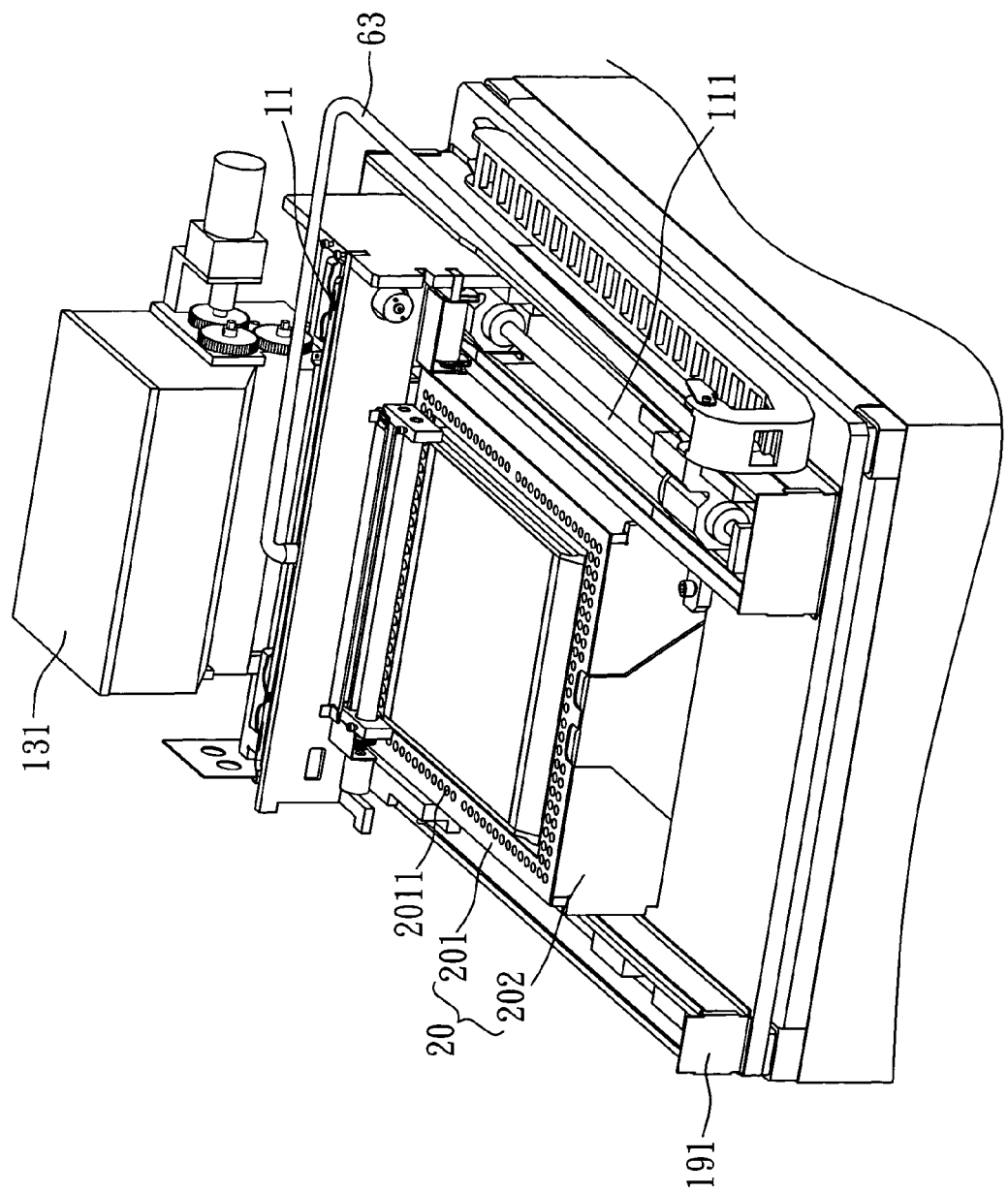
FIG. 5A is a perspective view showing a construction tank dust-proof structure of a printing module of the present invention.
Figure 5B:
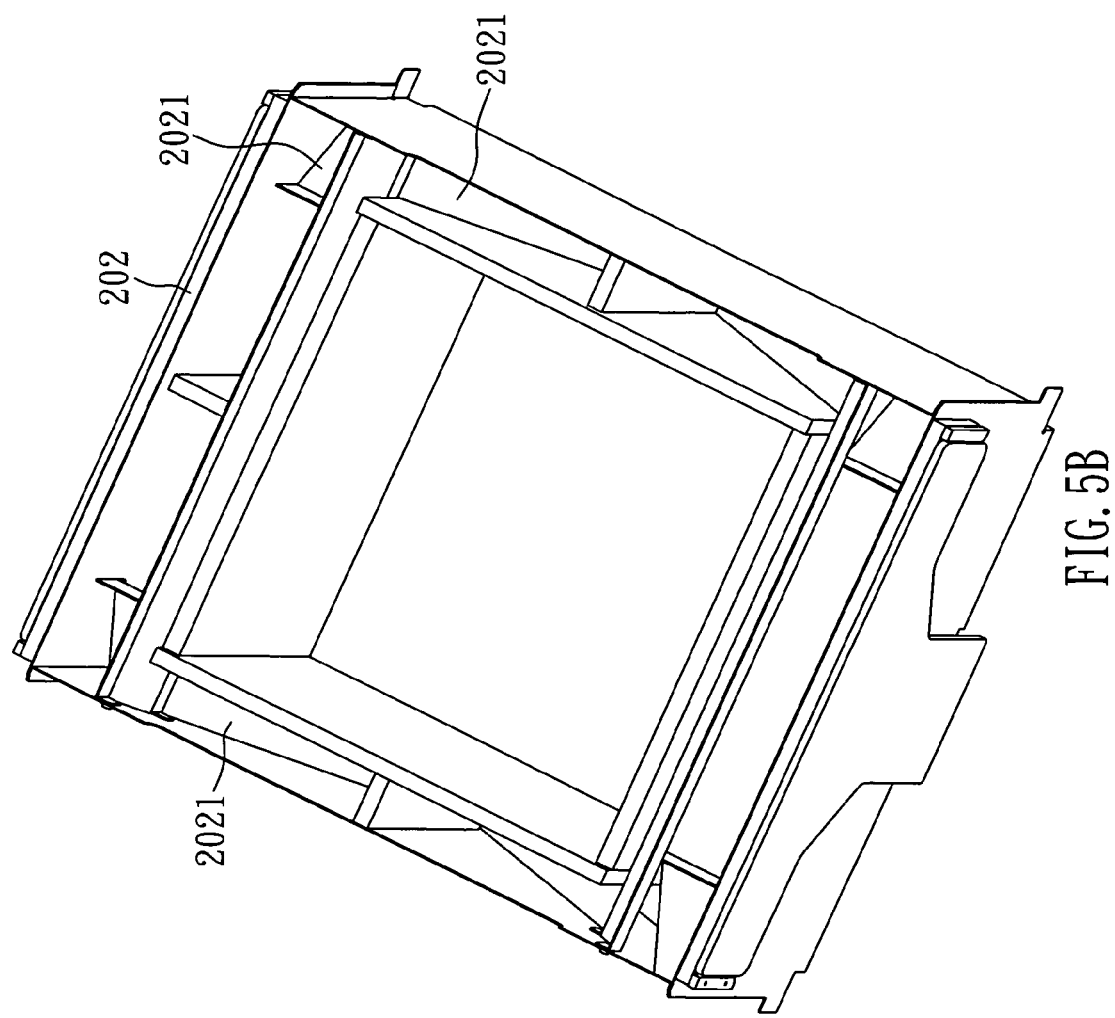
FIG. 5B is a perspective view of a construction tank dust-proof structure shown in FIG. 5A.
Figure 5C:
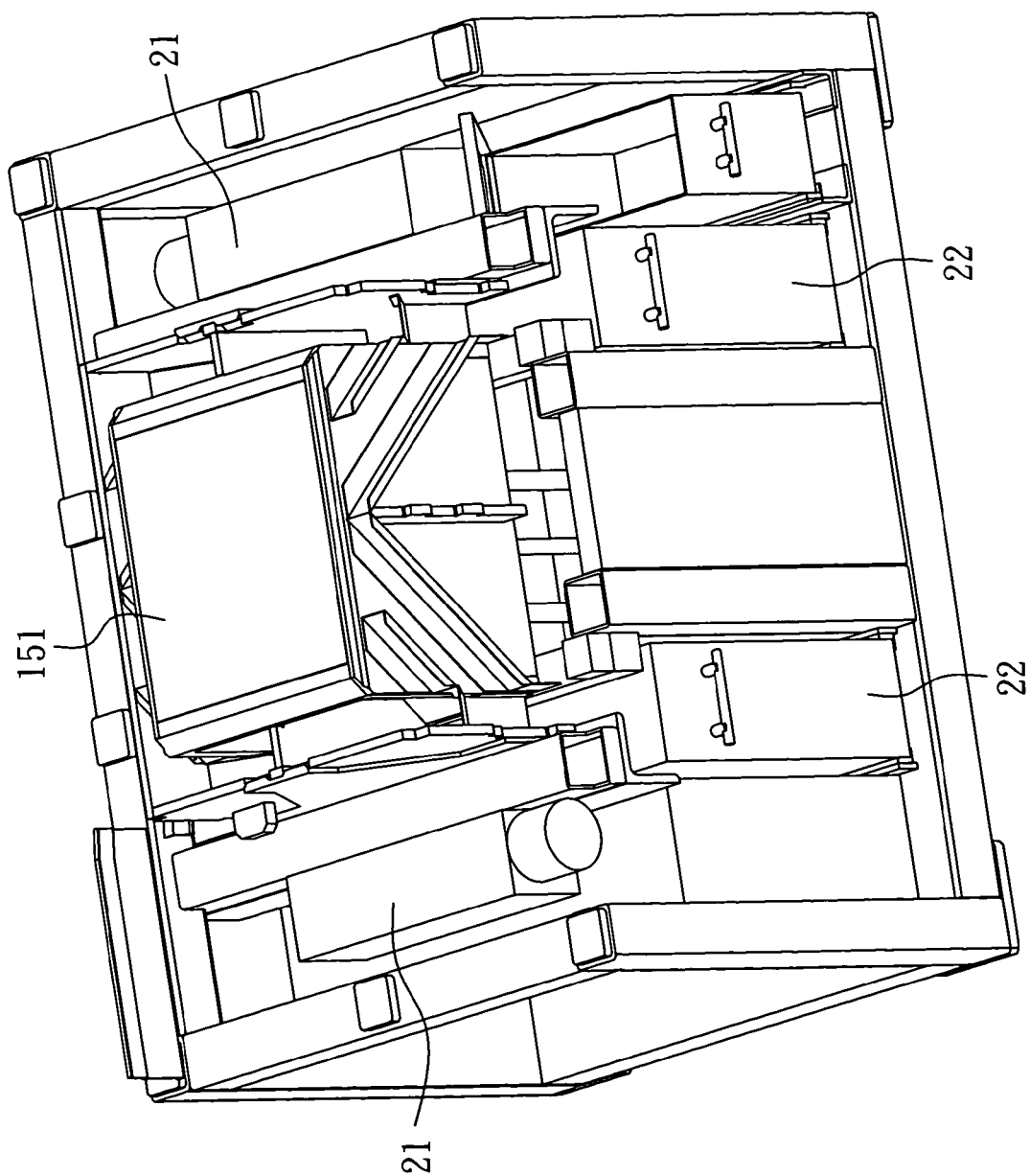
FIG. 5C is a perspective view of a first suction unit of a construction tank dust-proof structure arranged in a three-dimensional object forming apparatus of the present invention.

FIG. 5A is a perspective view showing a construction tank dust-proof structure of a printing module of the present invention. In order to illustrate the detailed structure, partial structure of the three-dimensional object forming apparatus shown in FIG. 1 is omitted in FIG. 5A. As shown in FIG. 5A, in some aspects, the construction tank dust-proof structure arranged in the three-dimensional object forming apparatus 1 of the present invention comprises: a falling-powder dust-proof portion 20, and a first suction unit 21, wherein the falling-powder dust-proof portion 20 wraps around the construction tank 15, and the construction platform 151 is arranged on the central region of the falling-powder dust-proof portion 20. Herein, the falling-powder dust-proof portion 20 comprises: a cap 201 with plural through holes 2011, and a body 202. In order to prevent the powder dropping and atmospherically circulating inside the body 202, the falling-powder dust-proof portion 20 may further comprise plural declined structures 2021, as shown in FIG. 5B. The declined structures 2021 co-operate with the absorption of the first suction unit 21, and collect the circulating powder from the through holes 2011 of the cap 201, and the declined structures 2021 of the body 202 to the collection tank 22, as shown in FIG. 5C.

When the printing cartridge 112 is idle, the remaining liquid containing adhesive on the printing head 1121 of the printing cartridge 112 may harden, and the circulating powder may adhere on the printing head 1121. The aforementioned condition may cause the property of the sequential printing process deterioration, and a 3D object with high quality cannot be obtained. Hence, in order to solve the aforementioned problems, the maintenance device 30 arranged in the three-dimensional object forming apparatus 1 of the present invention comprises: a cover component 31, and a scraping component 32, which are respectively arranged on the loading platform 91 of the construction stage 9. When the printing cartridge 112 is idle, the cover component 31 can seal the printing head 1121 of the printing cartridge 112 (as shown in FIG. 6D), and the scraping component 32 can remove the remaining liquid containing adhesive. Hence, it is possible to prevent the printing head 1121 becoming contaminated and blocked with congealed adhesive, as shown in FIG. 7F.

Figure 6A:
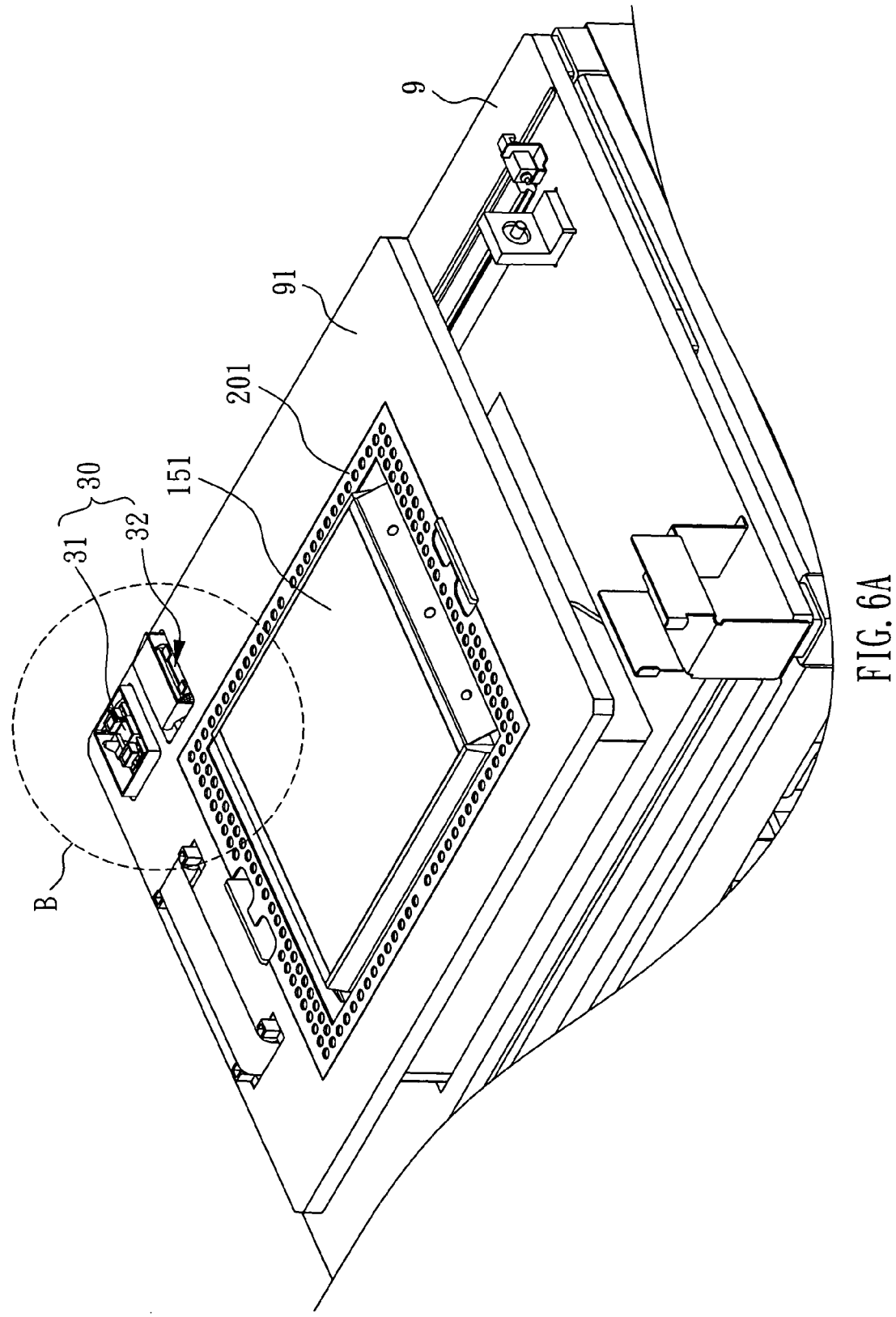
FIG. 6A is a perspective view of a maintenance device of a three-dimensional object forming apparatus of the present invention.
Figure 6B:
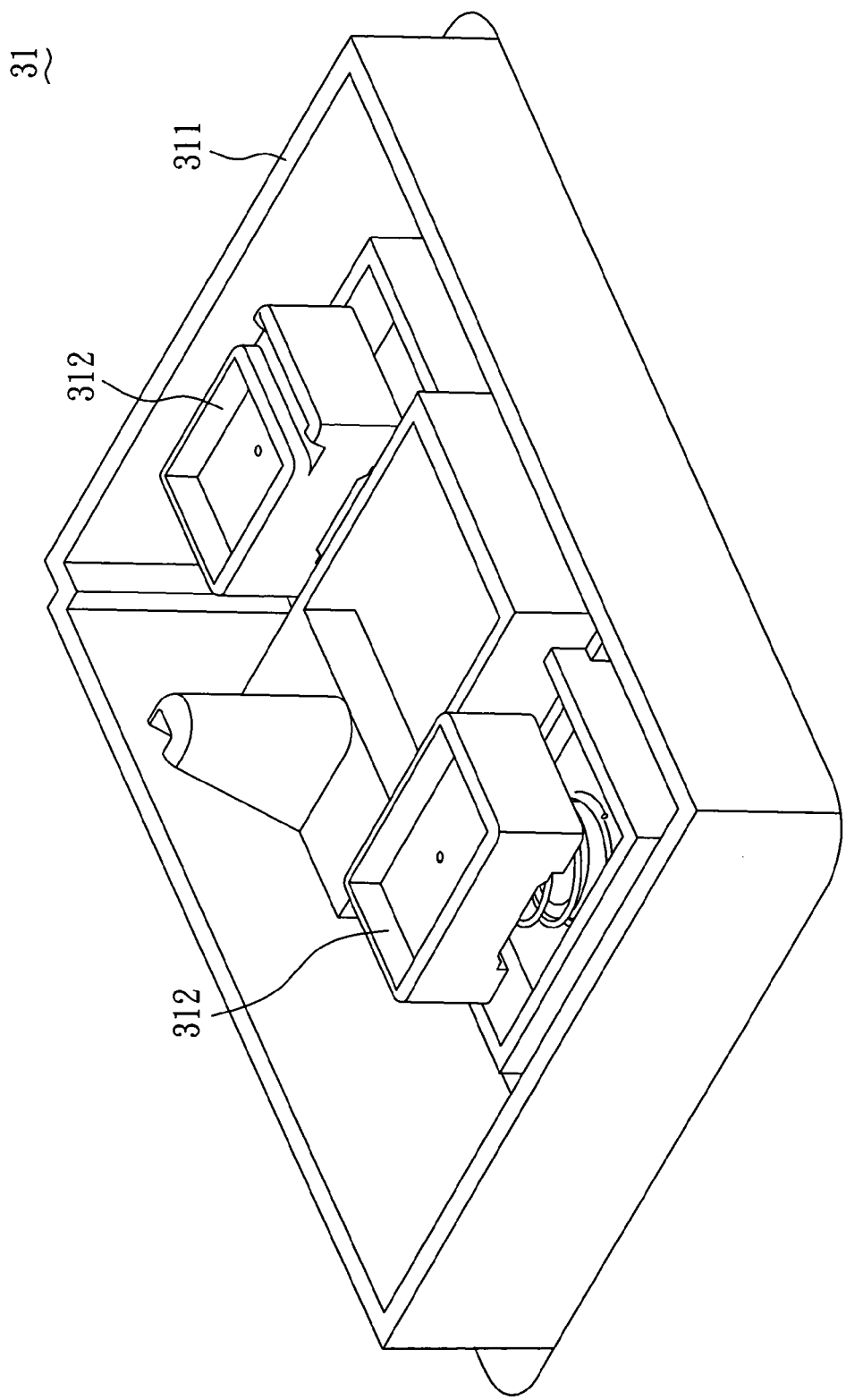
FIG. 6B is a perspective view of a cover component shown in FIG. 6A.

FIG. 6A is a perspective view of a maintenance device of a three-dimensional object forming apparatus of the present invention, and FIG. 6B is a perspective view of a cover component shown in FIG. 6A. As shown in FIG. 6A, the cover component 31 of the present invention comprises: a protection cover 311, and at least one sealing unit 312. The protection cover 311 is arranged on the loading platform 91 of the three-dimensional object forming apparatus 1, and the sealing unit 312 is arranged inside the protection cover 311. When the printing cartridge 112 is idle, the cover component 31 contacts the printing cartridge 112, so the at least one sealing unit 312 inside the protection cover 311 contacts and pushes the printing head 1121 of the printing cartridge 112 to seal the printing head 1121, as shown in FIG. 6D. Hence, it is possible to prevent the liquid containing the adhesive on the printing head 1121 of the printing cartridge 112 from becoming hardened, and further prevent the powder adhering on the printing head 1121. In some aspects, the amounts of the sealing unit 312 can be adjusted according to the amount of the printing cartridge 112.

Figure 6C:
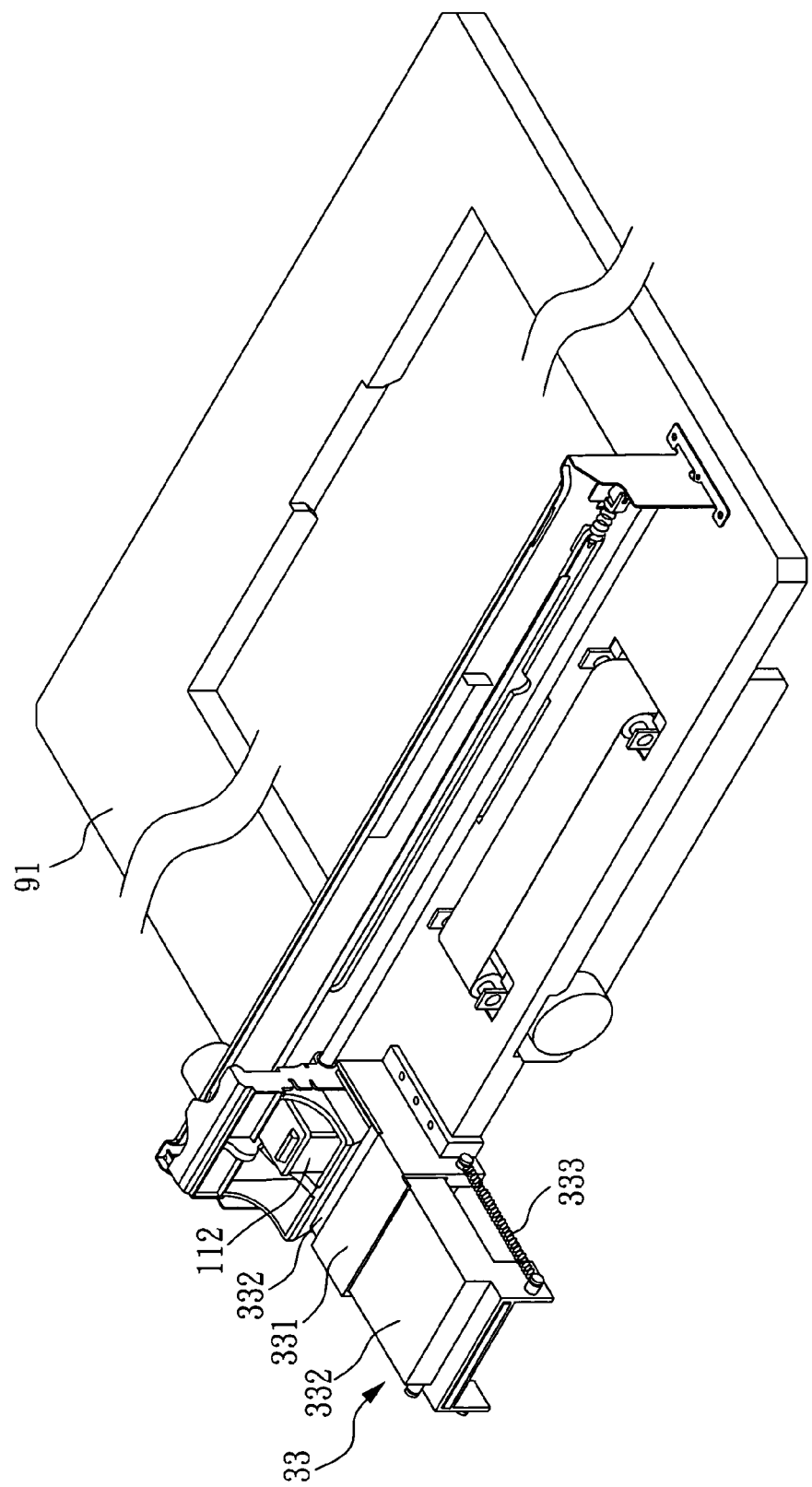
FIG. 6C is a perspective view of a dust-proof cover component arranged in a three-dimensional object forming apparatus of the present invention.

During the process of spraying the liquid containing the adhesive to form the object, the printing rate is 8 m/sec. Hence, at the instance that the droplets of the printing adhesive adhere to the powder, the powder with nano-sizes, which are non-adhered to the droplets, may circulate in the air due to turbulence arising from the high printing rate. Furthermore, during the process of powder supply and forming of the 3D object, the powder may also circulate in the air. In these conditions, the protection cover 311 may suffer from the pollution of the powder, and a dust-proof device has to be fitted. Hence, the maintenance device dust-proof structure of the present invention comprises: a dust-proof cover component 33 for separating the cover component 31 from the powder (as shown in FIG. 6C), and a pair of scraping components 32 for separating a dust-proof wiper part 4 from the powder (as shown in FIG. 7B).

When the printing cartridge 112 performs the printing process, and the protection cover 311 is idle, the dust-proof cover component 33 is closed to separate the protection cover 311 from the powder. Herein, the dust-proof cover component 33 comprises: a body 331, a movable cap 332, and an elastic element 333. The body 331 is arranged on the loading platform 91, and sheathed in the movable cap 332. In addition, the elastic element 333 can be a spring, wherein one end of the elastic element 333 is fixed to the body 331, and the other end is connected to the movable cap 332.

FIG. 6D and FIG. 6E are cross-sectional views showing how the dust-proof cover component of the present invention functions. As shown in FIG. 6D, when the printing cartridge 112 is idle and moves toward the protection cover 311, the carrying frame 114 of the printing cartridge 112 pushes to the movable cap 332 of the dust-proof cover component 33, to drive the movable cap 332 from the protection cover 311, i.e. the direction b shown in the figure. Then, the protection cover 311 is exposed, and the sealing unit 312 of the cover component 31 pushes the bottom of the printing cartridge 112 due to the linking-up relation between the carrying frame 114 and the cover component 31. (Herein, the linking-up relation between the carrying frame and the cover component is conventionally known in the maintenance technique of the printing head, and the description about that is omitted here.) Hence, the printing head 1121 of the printing cartridge 112 pushes the sealing unit 312, so the printing head 1121 is sealed. In this condition, the movable cap 332 is in an open state due to the pushing of the carrying frame 114 of the printing cartridge 112.

On the other hand, as shown in FIG. 6E, when the printing cartridge 112 is going to perform the printing process, the printing cartridge 112 departs from the protection cover 311 and moves toward the construction platform 151, i.e. the direction a shown in the figure. At this moment, the carrying frame 114 of the printing cartridge 112 does not urge against the movable cap 332 of the cover dust-proof component 33. Hence, the movable cap 332 moves toward the protection cover 311 through the elastic recovery force of the elastic element 333, and covers the protection cover 311 to prevent the protection cover 311 from being polluted by the circulating powder.

Figure 7C:
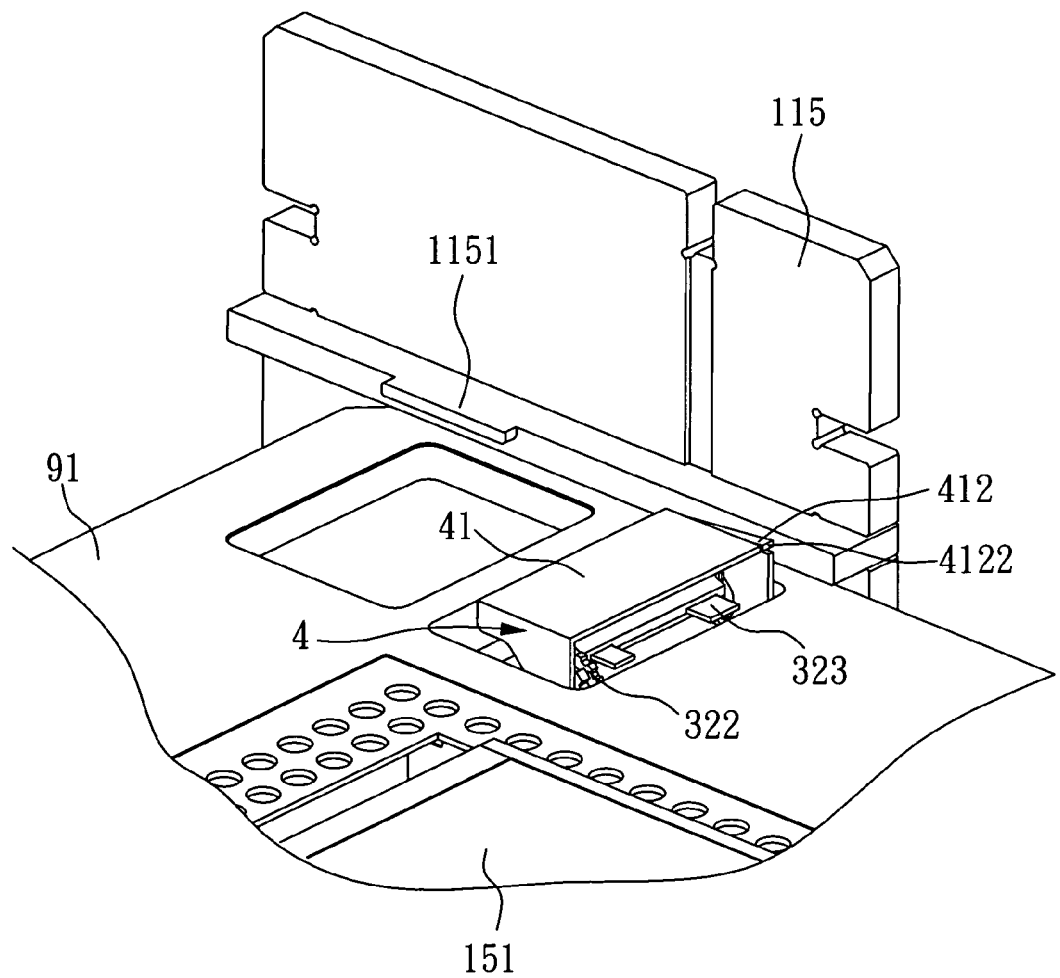
FIG. 7C is an enlarged perspective view of a region C in FIG. 7A.

FIG. 7A is a perspective view showing a dust-proof cleaning component arranged in a three-dimensional object forming apparatus of the present invention, and FIG. 7C is an enlarged perspective view of a region C in FIG. 7A. As shown in FIG. 7A, the dust-proof cleaning component 4 is arranged on the loading platform 91 of the three-dimensional object forming apparatus 1, the relative two sides of the loading platform 91 are respectively arranged with the plate unit 115 of the printing module 11, and the plate unit 115 is arranged on the transmission portion 111. Hence, the transmission portion 111 can drive the printing module 11 to move in the directions a and b, so the printing module 11 can perform the printing process on the construction platform 151.

As shown in FIG. 7A and FIG. 7C, a protrusion bar 1151 is arranged on a side of the plate unit 115. FIG. 7B is a perspective view showing the relationship between a scraping component and a dust-proof cleaning component 4 in FIG. 7A. As shown in FIG. 7B, the scraping component 32 comprises: a rotatable body 321, driven wheels 322, and at least one wiper 323. The driven wheels 322 drive the rotatable body 321 to rotate, the at least one wiper 323 is arranged on and moves with the rotatable body 321, and the material of the wiper 323 is rubber. In addition, the dust-proof cleaning component 4 comprises a cap 41, and a restoring unit 42. In the present embodiment, the restoring unit 42 is a torsion spring. The cap 41 is pivoted on the scraping component 32, and comprises a driven gear 411 arranged to mesh with the driven wheels 322.

Also, the restoring unit 42 hooks on the scraping component 32, so the restoring unit 42 can drive the cap 41 to rotate clockwise and counter-clockwise to connect with the scraping component 32. Also, the rotation of the cap 41 can make the driven gear 411 drive the driven wheels 322 to push the wiper 323 in an open state or in a closed state. When the wiper 323 is in an open state, the wiper 323 is arranged vertically, as shown in FIG. 7F. On the other hand, when the wiper 323 is in a closed state, the wiper 323 is arranged horizontally.

Figure 7D:
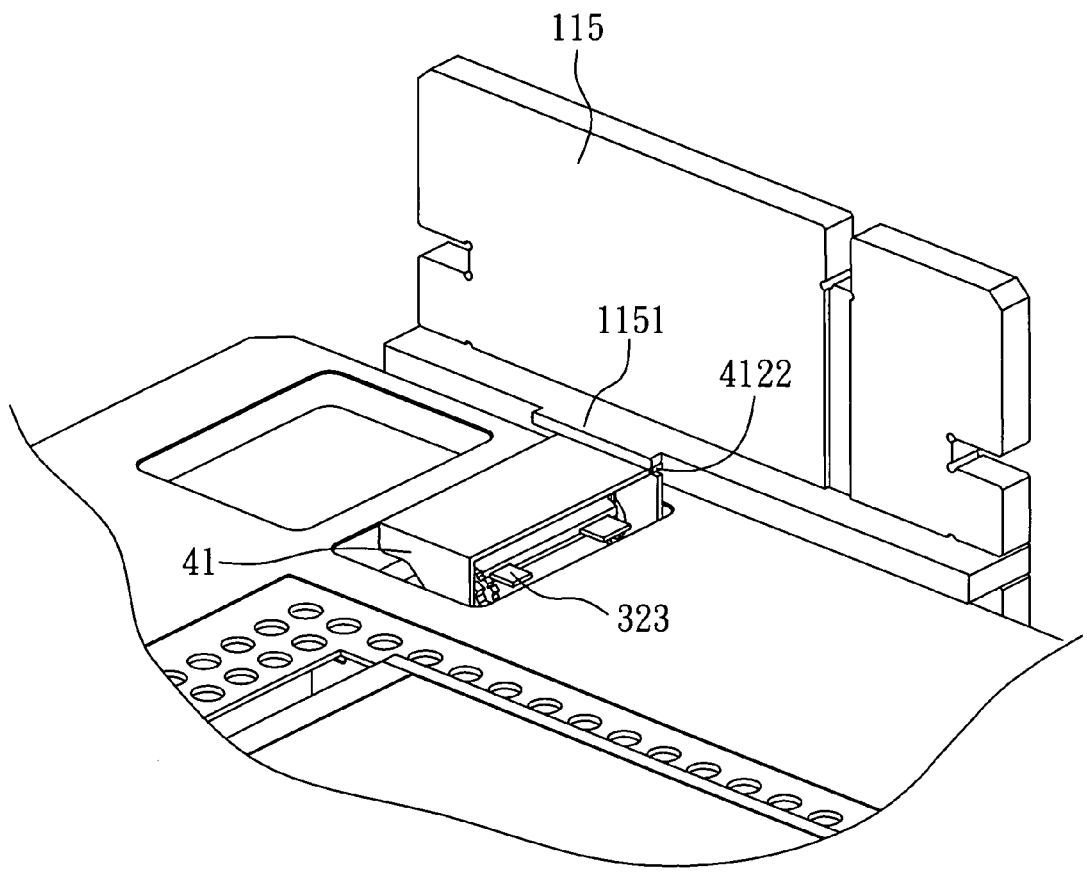
FIG. 7D is a perspective view showing a dust-proof cleaning component of a route-leading unit in FIG. 7C extending downward.
Figure 7E:
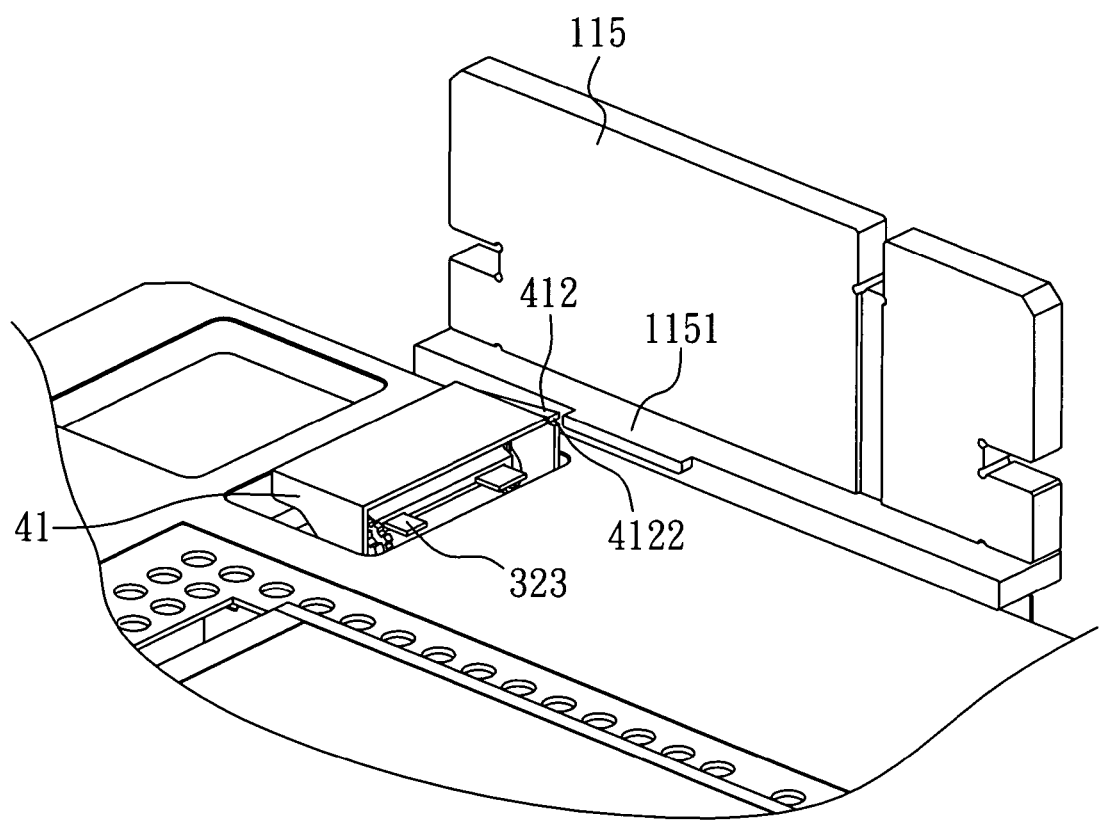
FIG. 7E is a perspective view showing a protrusion bar in FIG. 7C passing through a dust-proof cleaning component.
Figure 7F:
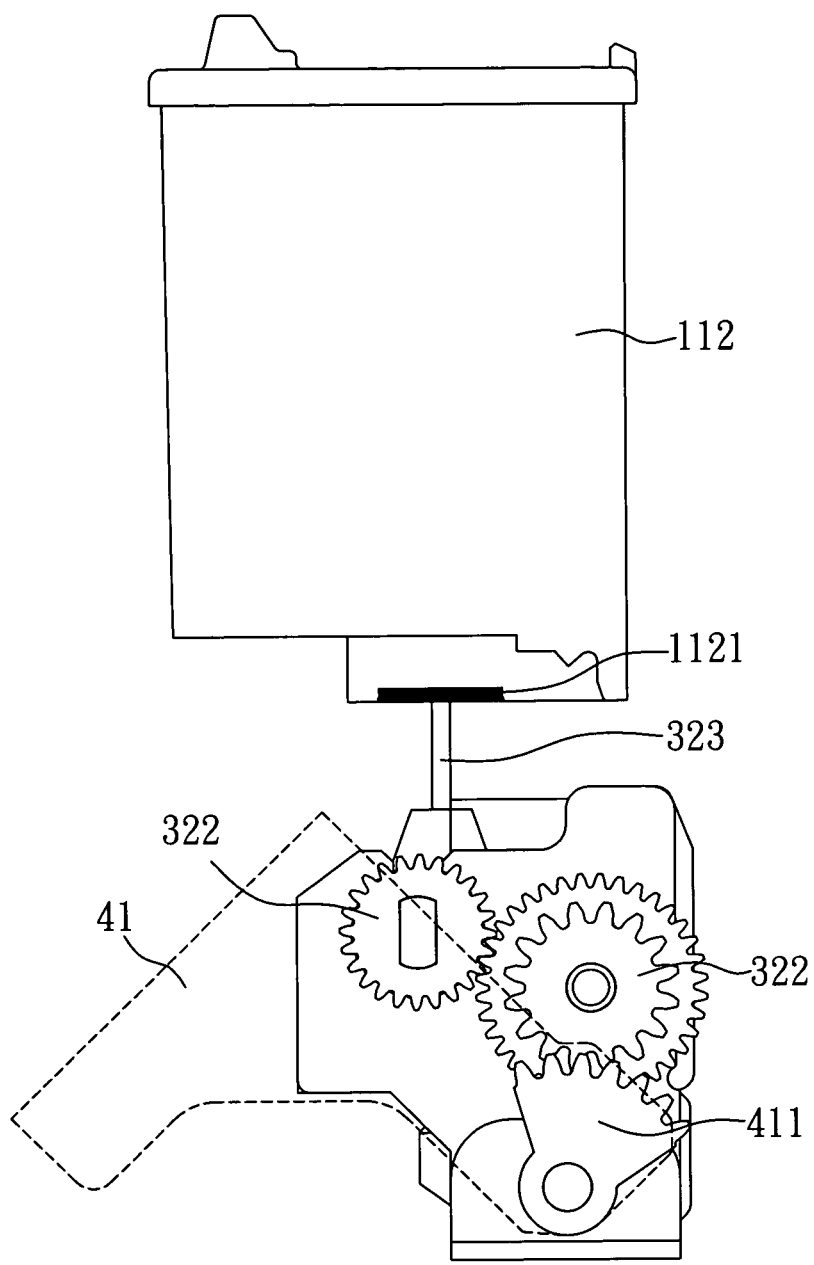
FIG. 7F is a perspective view showing that a scraping component cleans a printing head in FIG. 7C.

As shown in FIG. 7B, one side of the cap 41 has a route-leading unit 412, which is a flexible plate unit, and comprises: a declined plane 4121 and a pushing plane 4122. As shown in FIG. 7C, when the printing cartridge 112 departs from the protection cover 311 and moves toward the construction platform 151, and when the plate unit 115 moves to the dust-proof cleaning component 4, the protrusion bar 1151 of the plate unit 115 may move along the declined plane 4121 of the route-leading unit 412, and pass the dust-proof cleaning component 4, as shown in FIG. 7D. When the protrusion bar 1151 presses on the declined plane 4121, the route-leading unit 412 is driven to move downward due to the flexibility of the route-leading unit 412, as shown in FIG. 7D. Hence, the protrusion bar 1151 of the plate unit 115 passes through the cleaning dust-proof component 4, to drive the printing module 11 to spray the liquid on the construction platform 151, as shown in FIG. 7E.

On the other hand, when the printing process performed by the printing cartridge 112 of the printing module 11 is finished or the printing head 1121 is contaminated, the plate unit 115 drives the printing module 11 to move toward the dust-proof cleaning component 4, i.e. it moves along the direction a-b, as shown in FIG. 7A. Then, the protrusion bar 1151 of the plate unit 115 pushes the pushing plane 4122 of the route-leading unit 412, and the driven gear 411 connecting to the cap 41 drives the driven wheels 322 to rotate due to the push force generated from the movement of the plate unit 115. Hence, the cap 41 of the dust-proof cleaning component 4 moves downward. At the same time, the driven wheels 322 drive the wiper 323 to open vertically. Hence, the printing head 1121 passes through the wiper 323 on the cleaning dust-proof component 4, to remove the redundant liquid containing the adhesive from the printing head 1121. Therefore, the printing head 1121 can be prevented from becoming polluted and tacky.

As shown in FIG. 7C and FIG. 7D, when the wiper 323 of the dust-proof cleaning component 4 is idle, the protrusion bar 1151 of the plate unit 115 does not push and contact the pushing plane 4122 of the route-leading unit 412. Hence, the cap 41 is twisted and recovered through the restoring unit 42. Therefore, it is possible to prevent the powder atmospherically circulating in the air and prevent the scraping component 32 from being contaminated, by using the cap 41 to cover the scraping component 32.

As shown in FIG. 7B and FIG. 7F, when the wiper 323 finishes the cleaning process and departs from the printing cartridge 112, the cap 41 is twisted and recovered through the elastic recovery force of the restoring unit 42 of the dust-proof cleaning component 4. Then, the recovery of the cap 41 causes the driven gear 411 to drive the driven wheels 322 to rotate, and the wiper 323 is rotated to a closed state. After that, the cap 41 covers the scraping component 32 again, to prevent powder circulating in the air and to prevent the scraping component 32 from being contaminated by the liquid containing the adhesive.

Figure 8:
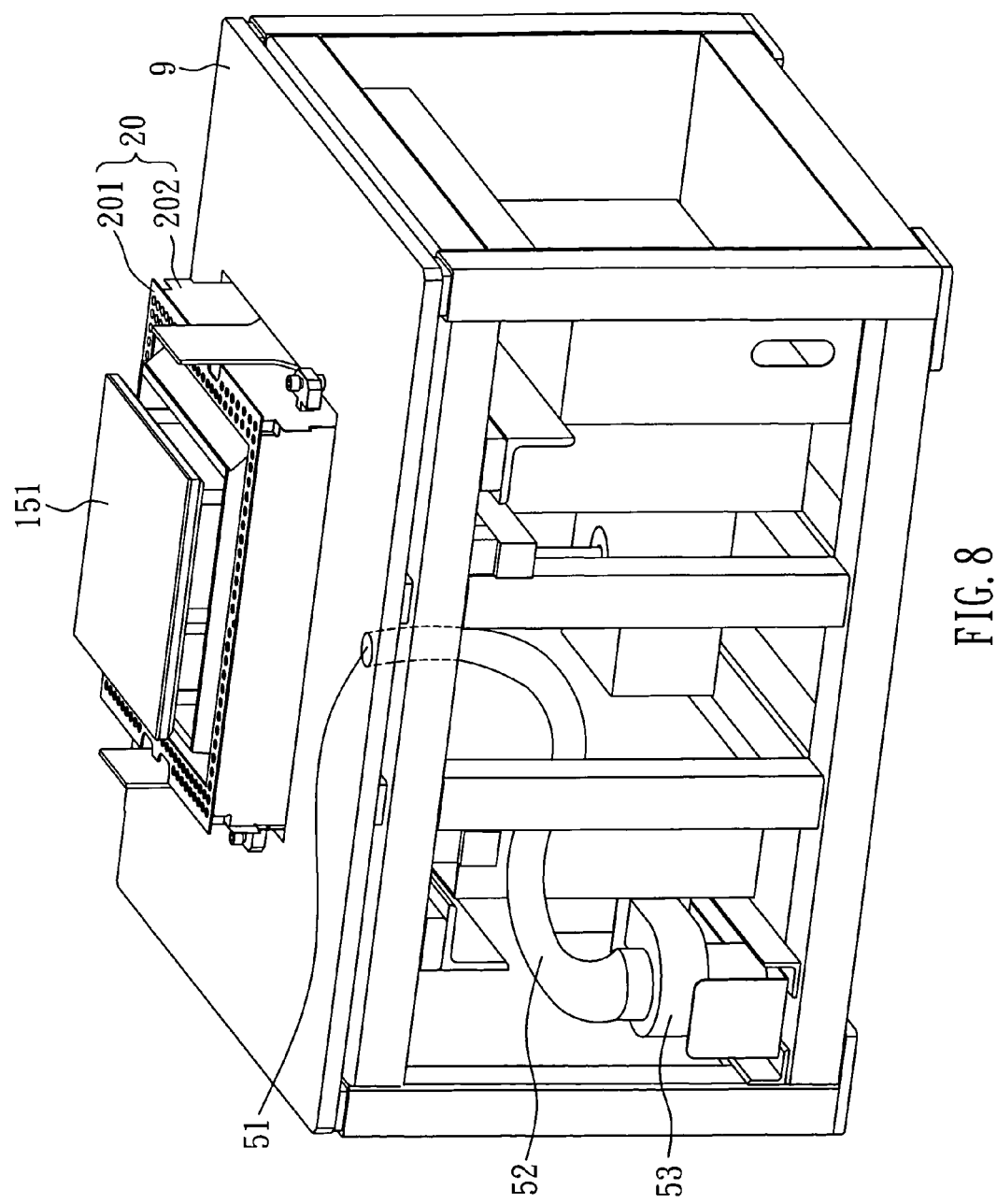
FIG. 8 is a perspective view of a working environment dust-proof structure of a three-dimensional object forming apparatus of the present invention.
Figure 19:
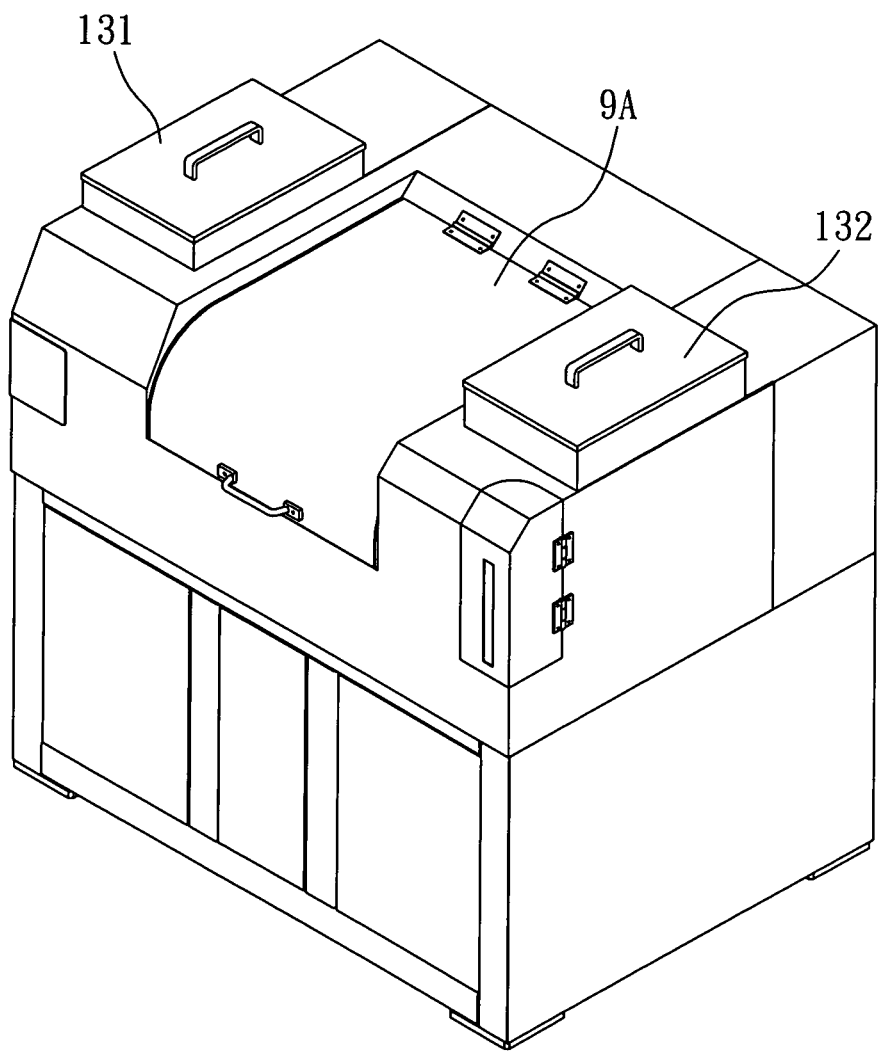
FIG. 19 is a perspective view showing the appearance of a three-dimensional object forming apparatus of the present invention.

FIG. 8 is a perspective view of a working environment dust-proof structure of a three-dimensional object forming apparatus of the present invention, and FIG. 19 is a perspective view showing the appearance of a three-dimensional object forming apparatus of the present invention. As shown in FIG. 8 and FIG. 19, the working environment side of the three-dimensional object forming apparatus 1 is separated from outside. When the working environment functions, the problem of the circulating powder may also be generated. Hence, in order to prevent the powder influencing the function and lifespan of the inner components, a dust-proof working environment structure can be installed inside the inner working environment in the present embodiment. The working environment dust-proof structure comprises a hole 51, a pipe 52, and a second suction unit 53. The hole 51 is arranged on the construction stage 9 and inside the inner working environment of the three-dimensional object forming apparatus 1, and further arranged under the covering of the cap 9A (as shown in the FIG. 19). The pipe 52 connects between the hole 51 and the second suction unit 53 to serve as a dust-collecting channel. Hence, the three-dimensional object forming apparatus 1 functions under the cap 9A to generate a negative pressure to attract the circulating powder into a recycle device (not shown in the figure).

Figure 9:
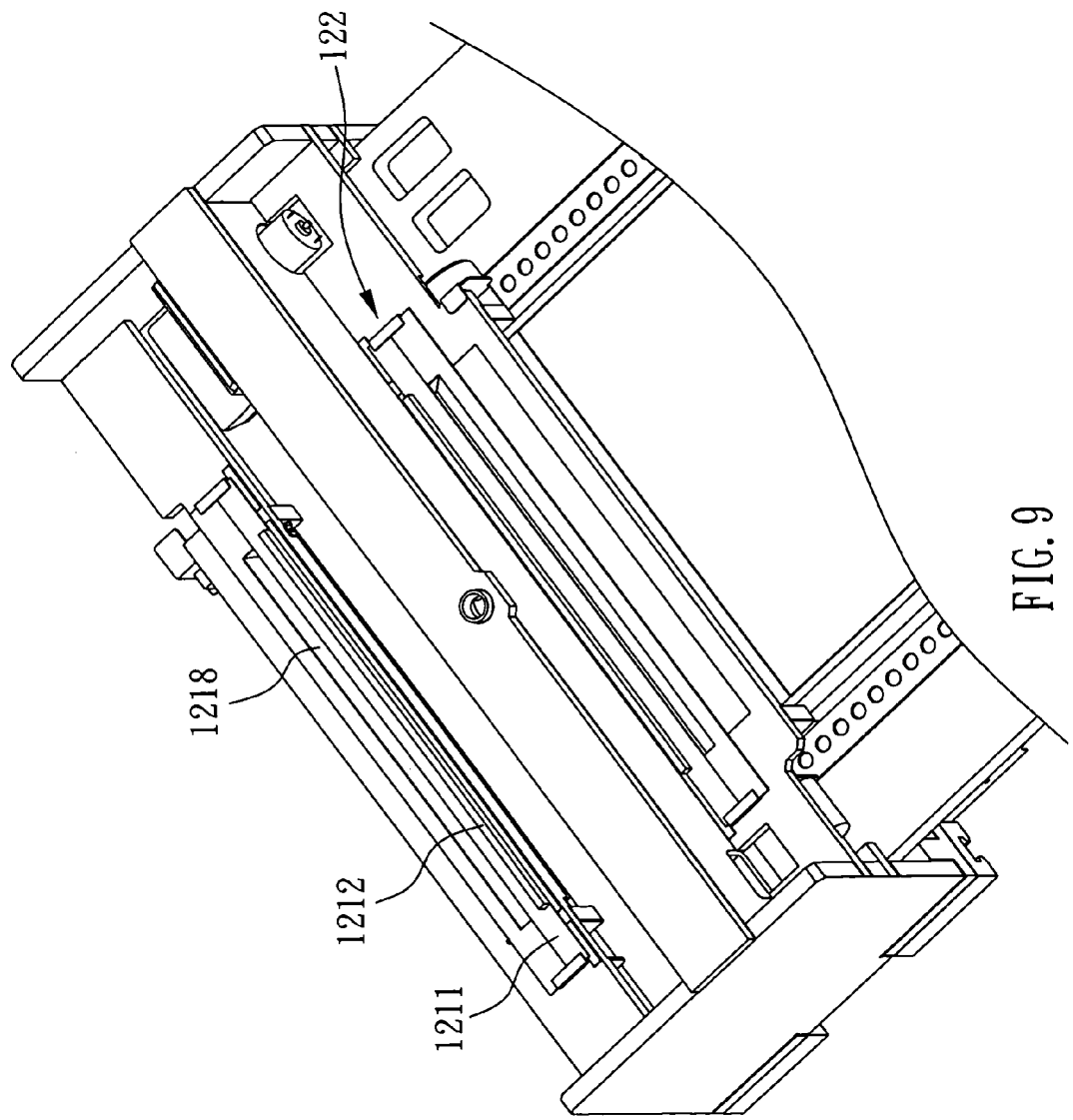
FIG. 9 is a perspective view showing a partial structure of a temporary storage tank in FIG. 1A.

FIG. 9 is a perspective view showing a partial structure of a temporary storage tank in FIG. 1A. As shown in FIG. 1F, FIG. 1G, and FIG. 9, in some aspects, a dust-proof storage tank structure is arranged inside the temporary storage tank 121, wherein the dust-proof storage tank structure comprises a cap 1211, an elastic element 1213, and a declined structure 1218 arranged in the temporary storage tank 121. The cap 1211 is arranged over the temporary storage tank 121, and connects to the temporary storage tank 121 through the elastic element 1213. Hence, the cap 1211 can move left and right to open or close the notch of the temporary storage tank 121.

When the cap 1211 of the temporary storage tank 121 is open to perform the powder supplying process, the declined structure 1218 can introduce the path for powder supply. Also, the declined structure 1218 can prevent powder directly dropping and causing the condition of powder circulating in the air. In addition, when the powder supplying process is finished, the cap 1211 is closed. Hence, the circulating powder, which is generated when the temporary storage tank 121 spreads powder, can be restricted inside the temporary storage tank 121 to accomplish the dust-proofing objective.

Figure 10A:
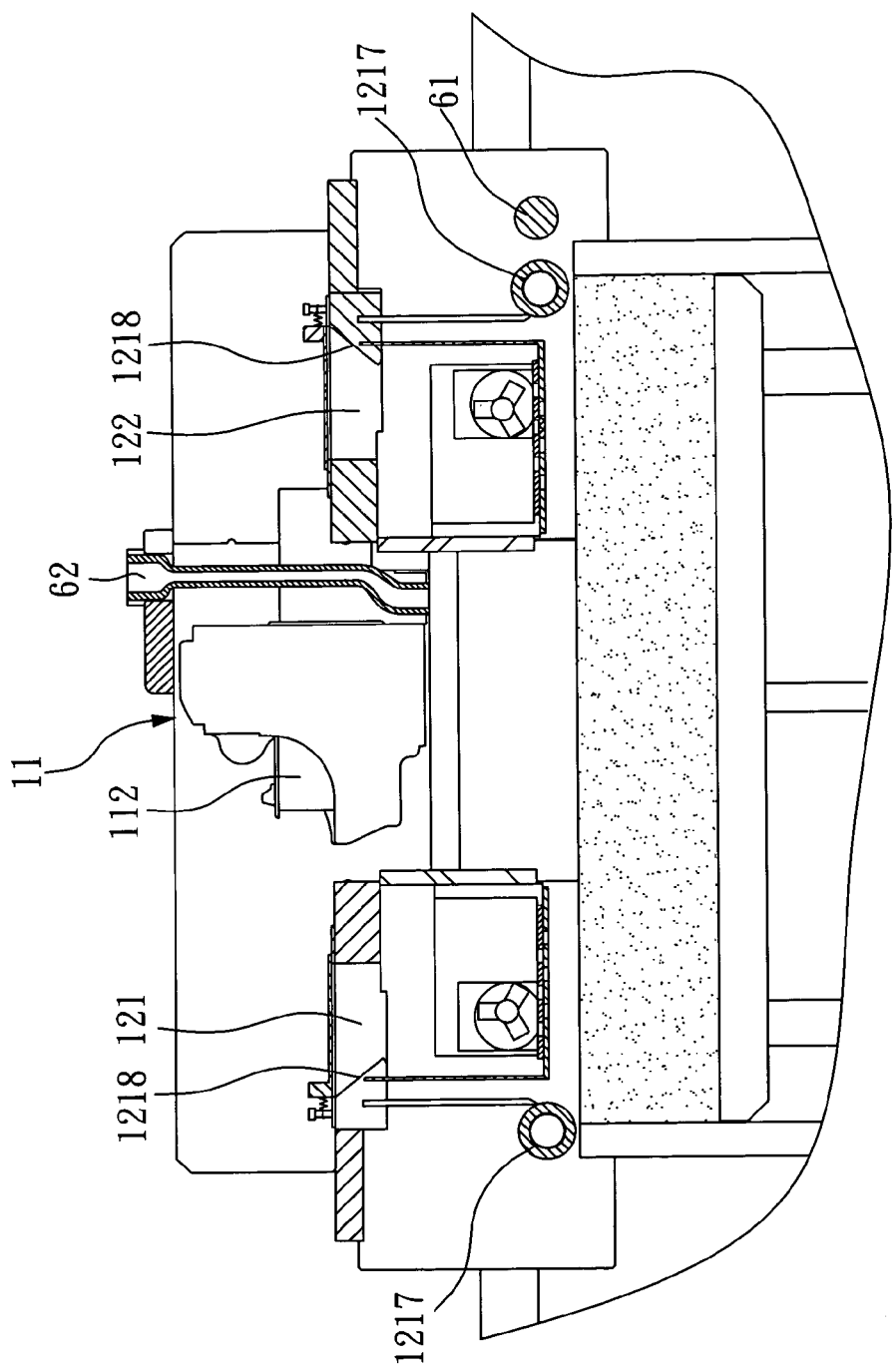
FIG. 10A is a cross-sectional view of an air recirculating and heating device arranged in a three-dimensional object forming apparatus of the present invention.

FIG. 10A is a cross-sectional view of an air recirculating and heating device arranged in a three-dimensional object forming apparatus of the present invention. As shown in FIG. 10A, the air recirculating and heating device of the present invention can comprise at least one heating device 61. Herein, the heating device 61 can be a quartz heating tube, but is not limited thereto. The heating device 61 is arranged on one side of a roller 1217. When the printing process performed by the printing module 11 is finished, the heating device 61 can heat and dry the liquid adhered on the powder immediately. Hence, the rate of the powder spreading process can be increased. In some aspects, the air recirculating and heating device may further comprise a heat sensor (not shown in the figure), which is used to detect the heating temperature, and control the performance of the heating device 61 according to the detection result. When the heat sensor detects that the heating device 61 has reached a certain temperature, the heating device 61 is deactivated immediately.

Figure 10B:
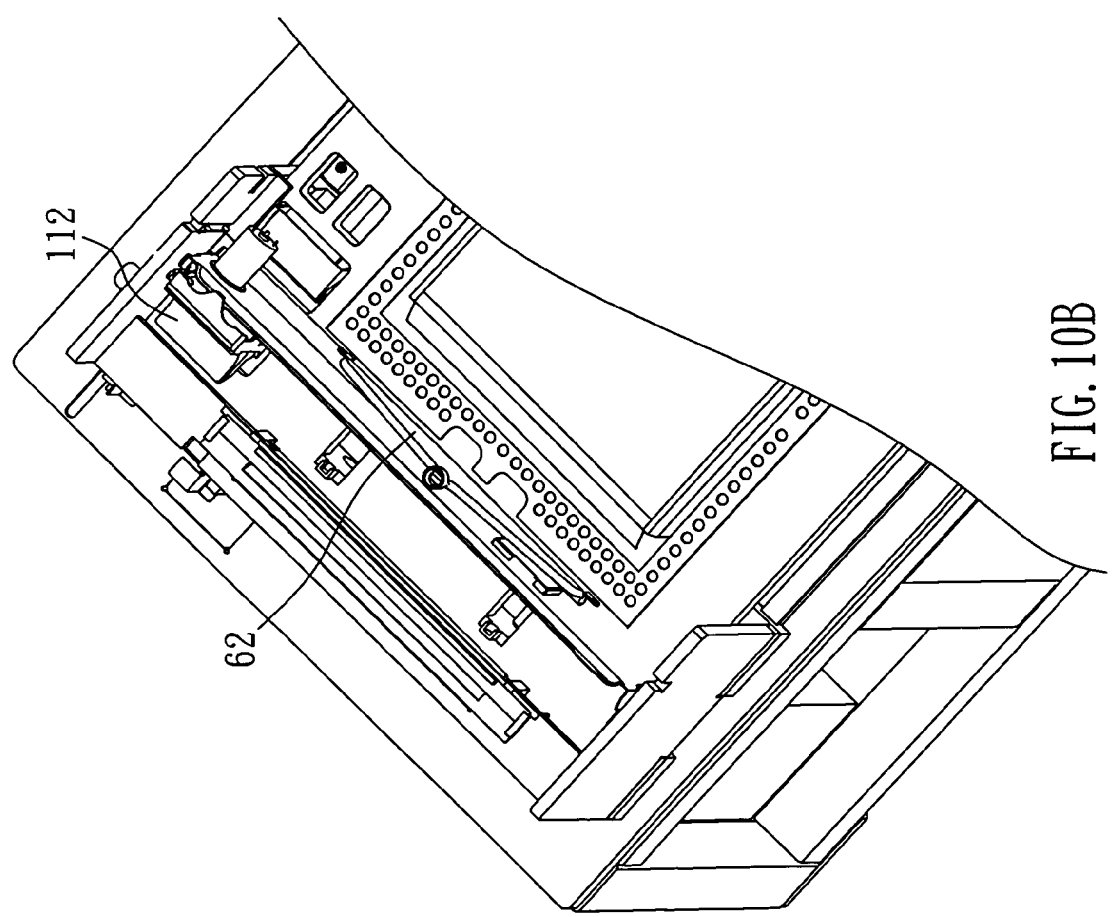
FIG. 10B is a perspective view showing an air recirculating and heating device arranged in a three-dimensional object forming apparatus of the present invention.

FIG. 10B is a perspective view showing an air recirculating and heating device arranged in a three-dimensional object forming apparatus of the present invention. As shown in FIG. 10A and FIG. 10B, the air recirculating and heating device may further comprise an air recirculation tunnel 62, in order to prevent the convection heat causing damage to the heating device 61. The air recirculation tunnel 62 may connect to an air-extracting device (not shown in the figure) through a pipe 63 (as shown in FIG. 5A). Hence, the flowing path of the heat can be introduced into the air recirculation tunnel 62, so the heat does not flow through the printing cartridge 112 of the printing module 11, and thus damage to the printing head 1121 is avoided. In some aspects, the heating device 61 and the air recirculation tunnel 62 are arranged on the same side, preferably. In addition, the air recirculation tunnel 62 cooperating with the air-extracting device not only can control the flowing path of the heat, but also can attract the circulating specks of powder, their trajectories generated by turbulence during the printing process of the printing module 11, into the recycle tank. Hence, the dust-proof objective for the printing head can be accomplished.

Figure 11:
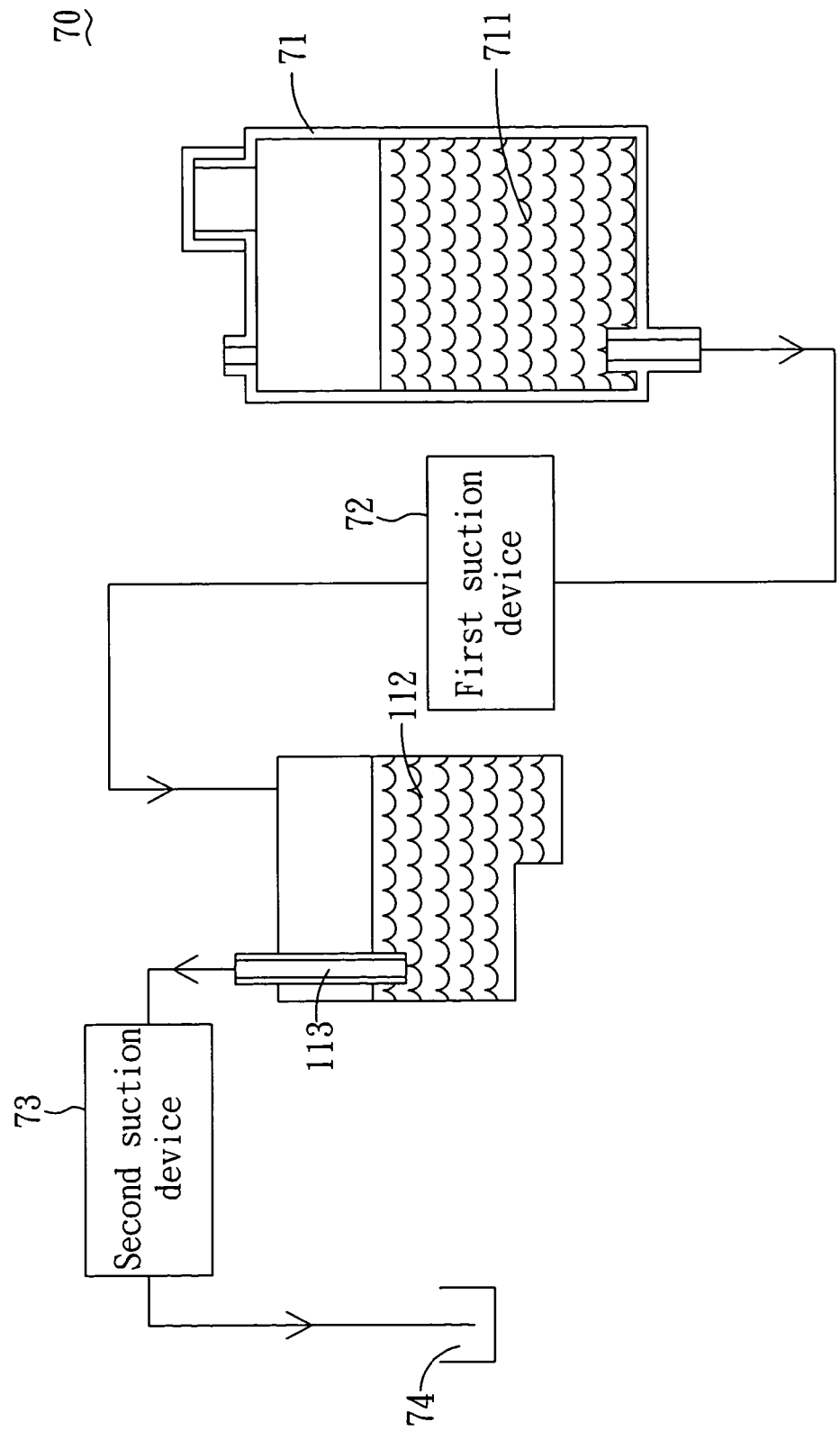
FIG. 11 is a perspective view of continuous liquid supply device of a three-dimensional object forming apparatus of the present invention.

FIG. 11 is a perspective view of continuous liquid supply device of a three-dimensional object forming apparatus of the present invention. As shown in FIG. 11, the continuous liquid supply device 70 of the present embodiment may comprise: a liquid supply container 71, a first suction device 72, a second suction device 73, and a recycle tank 74. Herein, the liquid supply container 71 is arranged outside the three-dimensional object forming apparatus 1 to store the liquid 711 containing the adhesive for the printing process of the printing module 11. In addition, the liquid 711 stored inside the liquid supply container 71 is introduced into the printing cartridge 112 by means of a conduit and the suction of the first suction device 72. Also, the redundant liquid 711 inside the printing cartridge 112 can be introduced into the recycle tank 74 by means of a conduit and the suction of the first suction device 72.

According to the number of nozzles of the printing cartridge 112, the software of the three-dimensional object forming apparatus 1 calculates the printing amount of the liquid 711 containing the adhesive when the printing module 11 operates. Then, the first suction device 72 draws the liquid with the amount, which is a little bit greater than the calculated printing amount, from the liquid supply container 71 into the printing cartridge 112. When the printing process of the printing cartridge 112 is completed, the redundant liquid 711 inside the printing cartridge 112 can be drawn by the second suction device 73 and directed into the recycle tank 74. In the present embodiment, the first suction device 72 and the second suction device 72 are pumps.

In addition, the first suction device 72 of the present invention has the function of single-direction non-return. Hence, the liquid supply container 71 can be placed in any position, which is lower than the elevation of the printing head of the printing cartridge 112. Furthermore, the height, at which a liquid level detector 113 of the printing cartridge 112 inserts into the liquid 711, can be used to control and detect the height and the content that the liquid 711 can be stored inside the printing cartridge 112. In the condition that the recycle tank 74 is clean, the liquid 711 can be poured back into the liquid supply container 71 for reuse.

During the powder spreading process, the powder with lightweight or small particles may circulate inside the working environment. In addition, when the powder drops down from the through hole of the falling-powder dust-proof portion, the dropping powder may strike partial structure and cause some powder to rebound and ricochet. Also, the powder dropping into the collection tank may rebound due to striking the interior of the tank, and the circulating powder may pollute the working environment. Hence, in the present embodiment, a powder filtration unit is further used to improve the recycling rate of the powder, so the three-dimensional object forming apparatus can perform normally under an environment without pollution.

Figure 13:
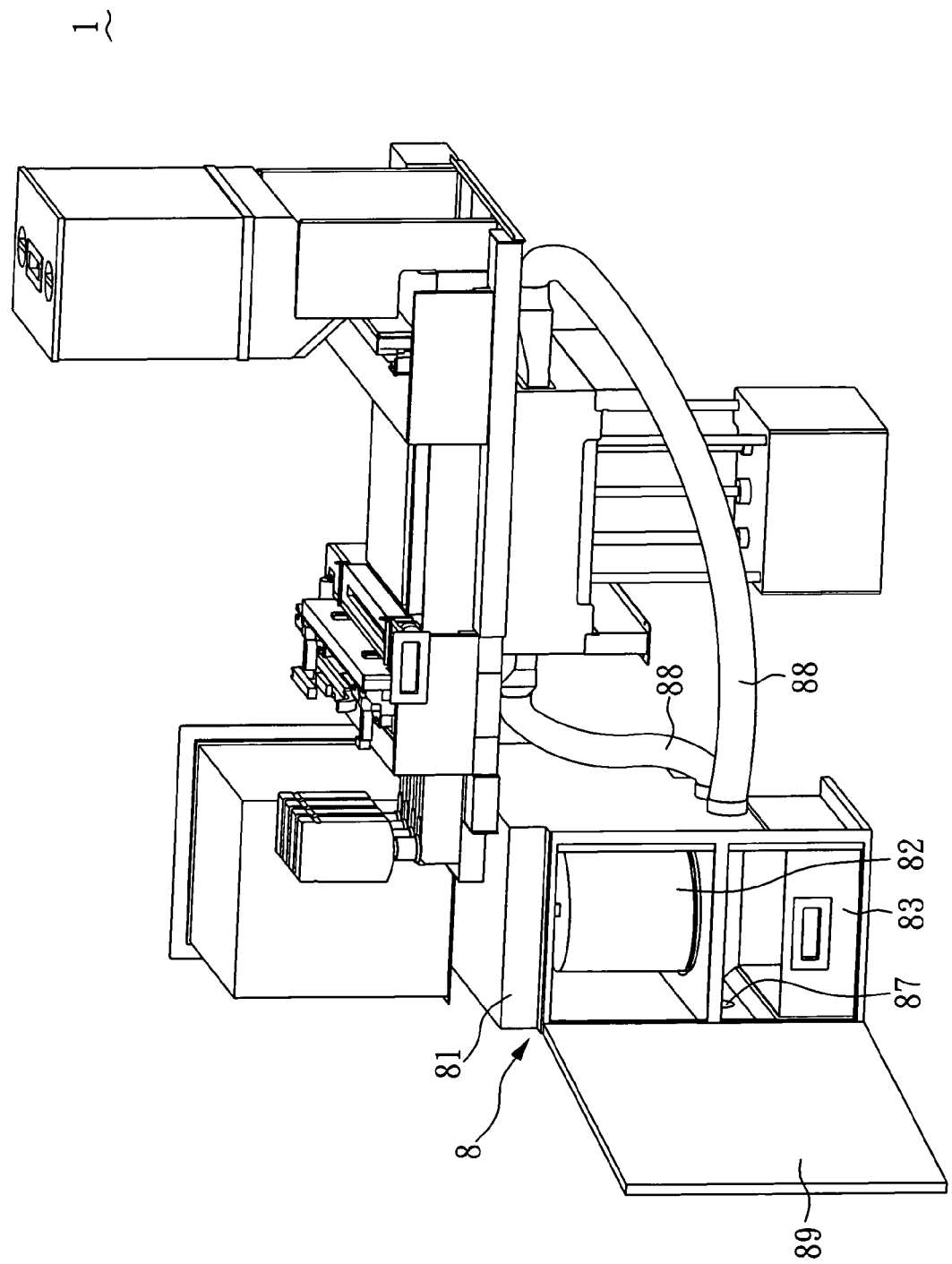
FIG. 13 is a partial exploded view of a powder filtration unit of a three-dimensional object forming apparatus of the present invention.

As shown in FIG. 13, the powder filtration unit 8 of the present invention is connected to the three-dimensional object forming apparatus 1 through a pipe 88. Herein, the powder filtration unit 8 is used to attract and filtrate the circulating powder generated during the operation of the three-dimensional object forming apparatus 1.

Figure 14:
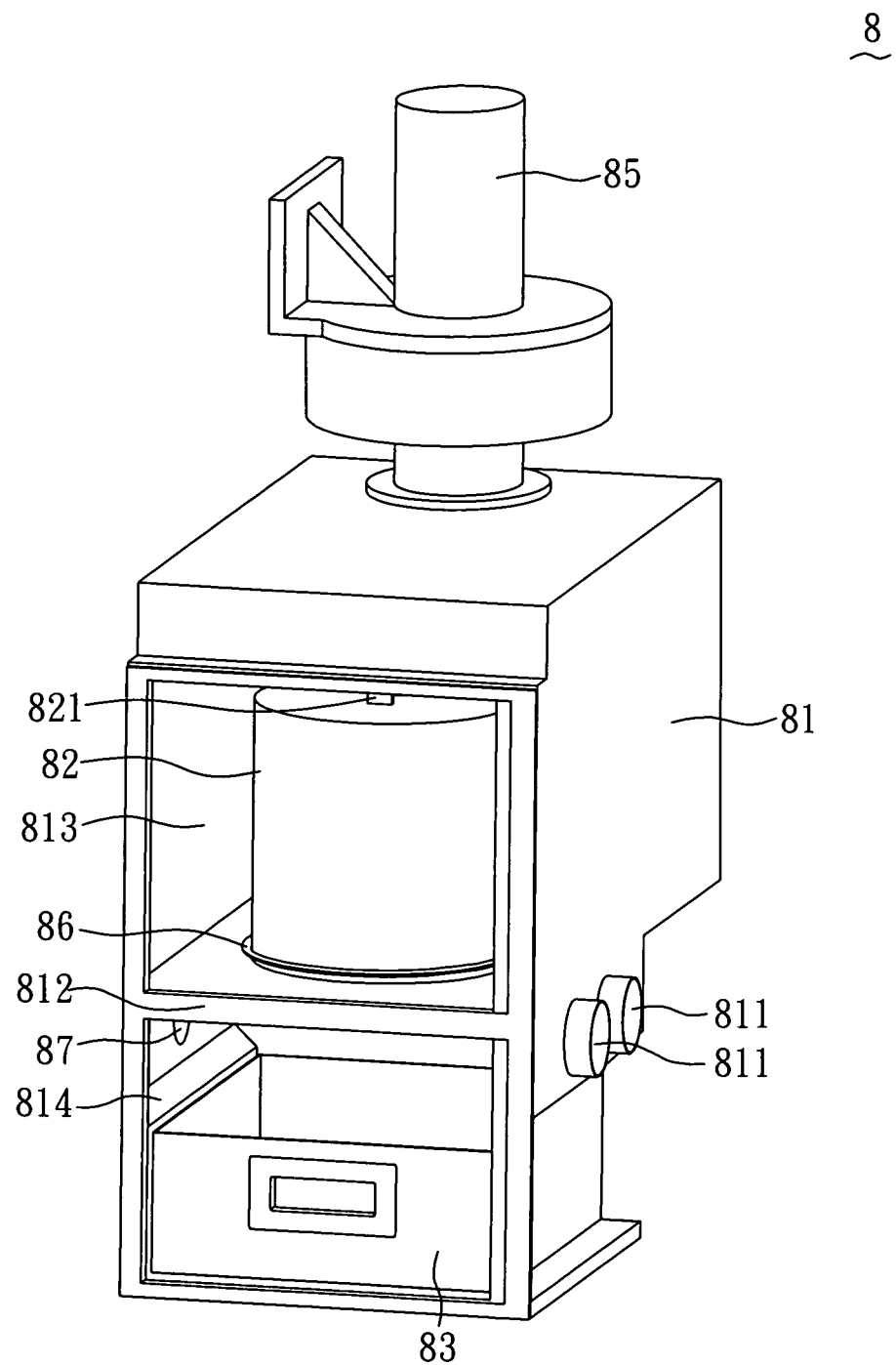
FIG. 14 is a perspective view of a powder filtration unit shown in FIG. 13.
Figure 15:
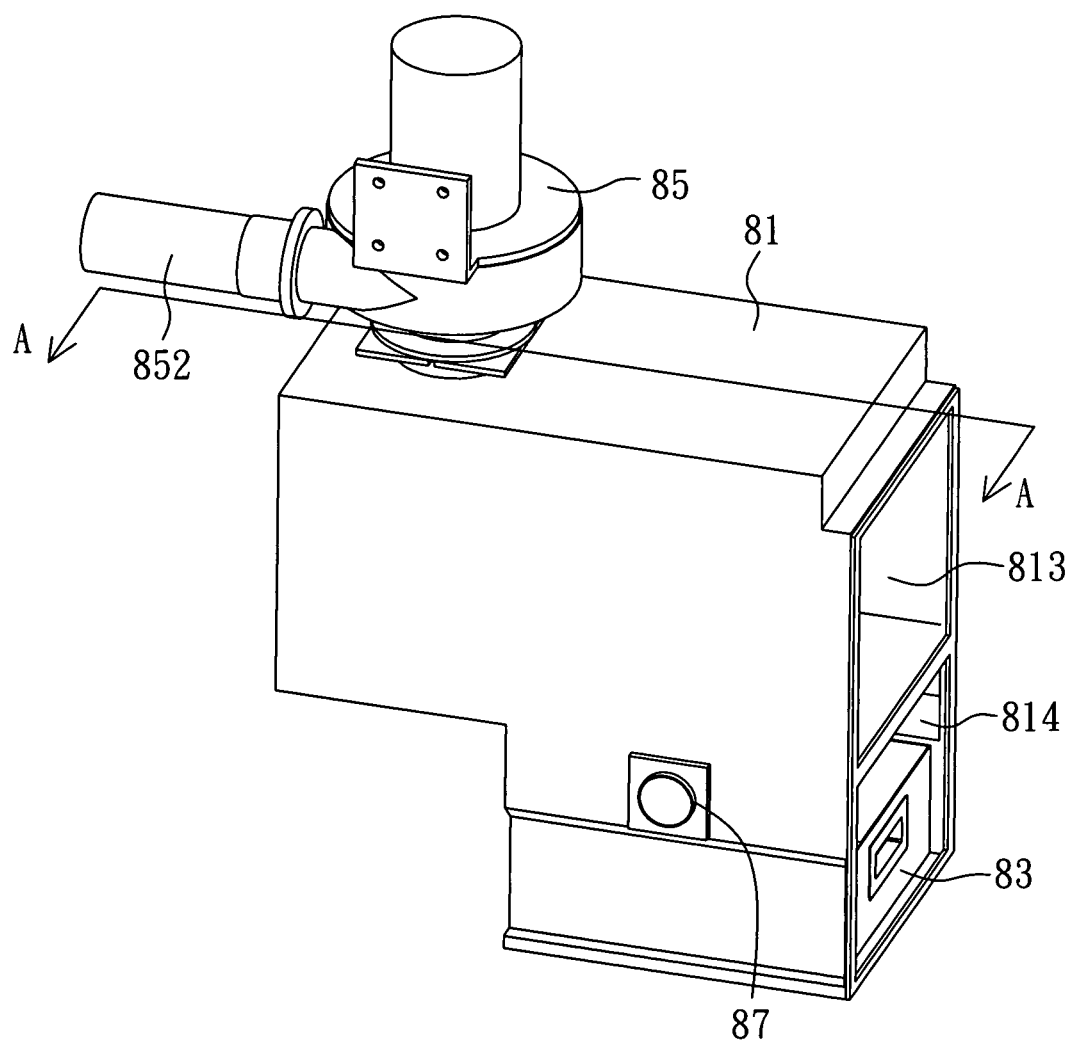
FIG. 15 is a perspective view showing another side of FIG. 14.
Figure 16:
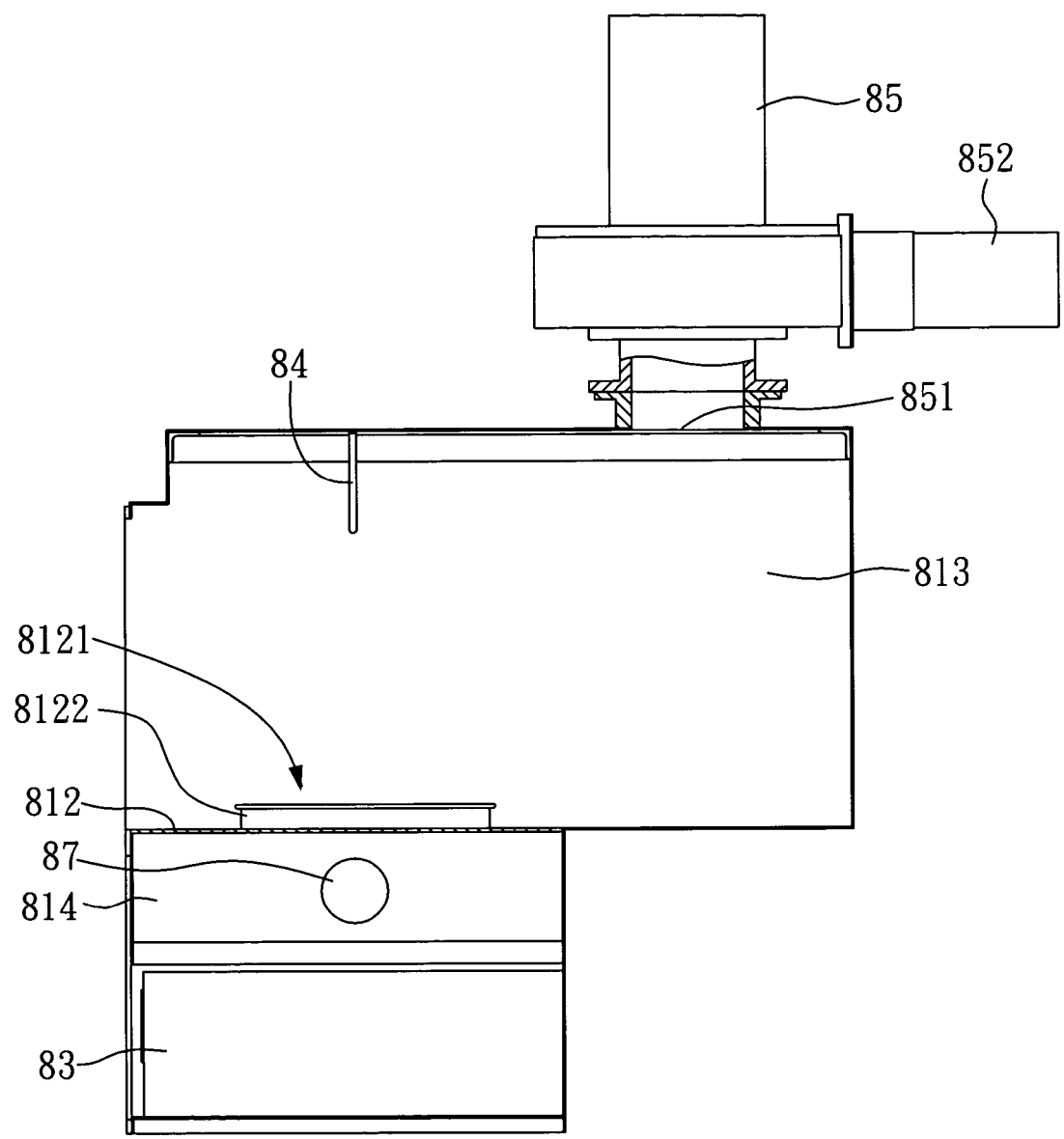
FIG. 16 is a cross-sectional view along the A-A line of FIG. 15 without showing a powder filtration unit.

FIG. 14 is a perspective view of a powder filtration unit shown in FIG. 13. FIG. 15 is a perspective view showing another side of FIG. 14, and FIG. 16 is a cross-sectional view along the A-A line of FIG. 15 without showing a powder filtration unit. As shown in FIG. 13 and FIG. 15, the powder filtration unit 8 of the present invention at least comprises: a housing 81, a powder filtration unit 82, a recycle unit 83, a supporting element 84, a suction unit 85, and a sealing element 86. Herein, the housing 81 has a suction inlet 811, which connects to the three-dimensional object forming apparatus 1 through the pipe 88, and a separator 812 is arranged inside the housing 81. The separator 812 has an opening 8121 facing up and down, and a convex ring 8122 is disposed around the upper surface of the opening 8121 (as shown in FIG. 16). In addition, one end of the supporting element 84 is fixed to the inner top of the housing 81, and can be a hook.

Figure 17:
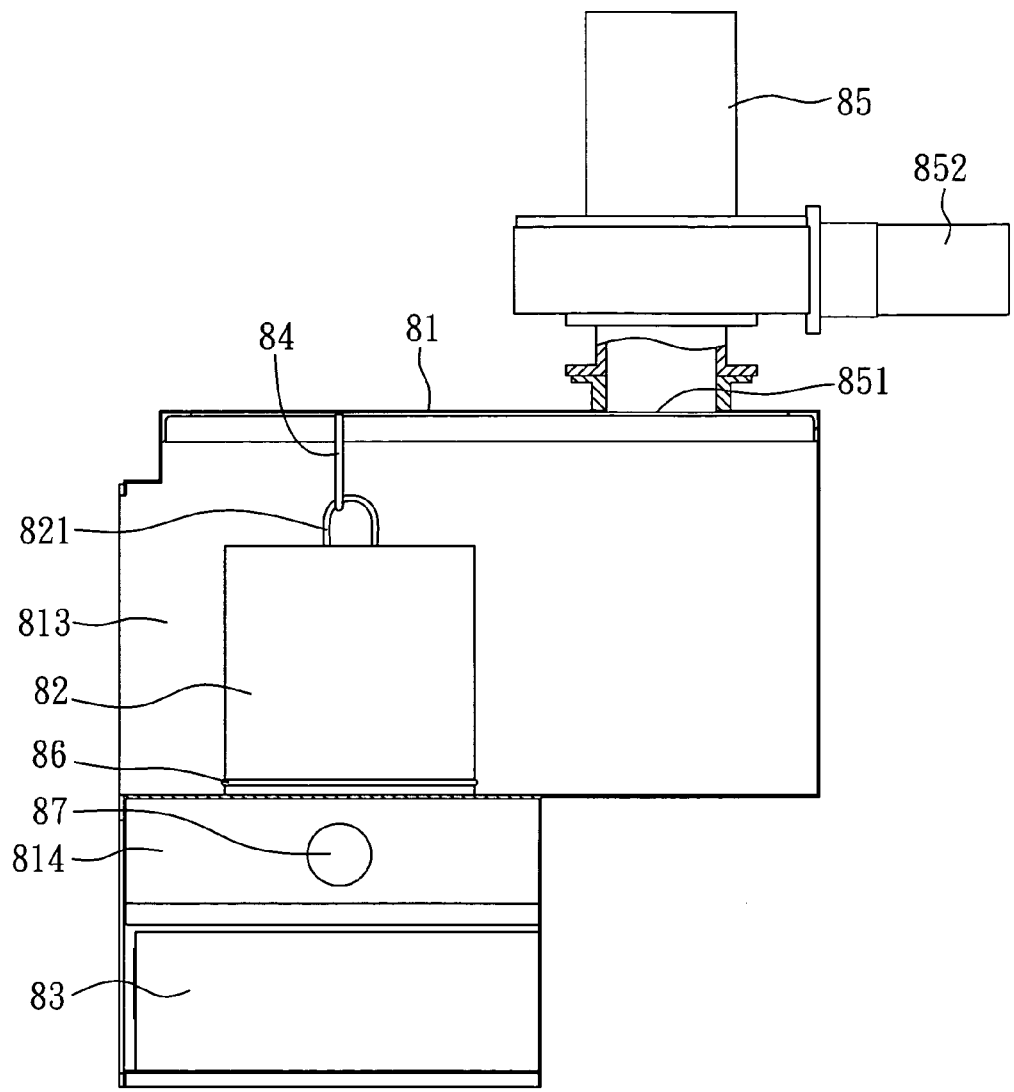
FIG. 17 is a cross-sectional view along the A-A line of FIG. 15 with a powder filtration unit.
Figure 18:
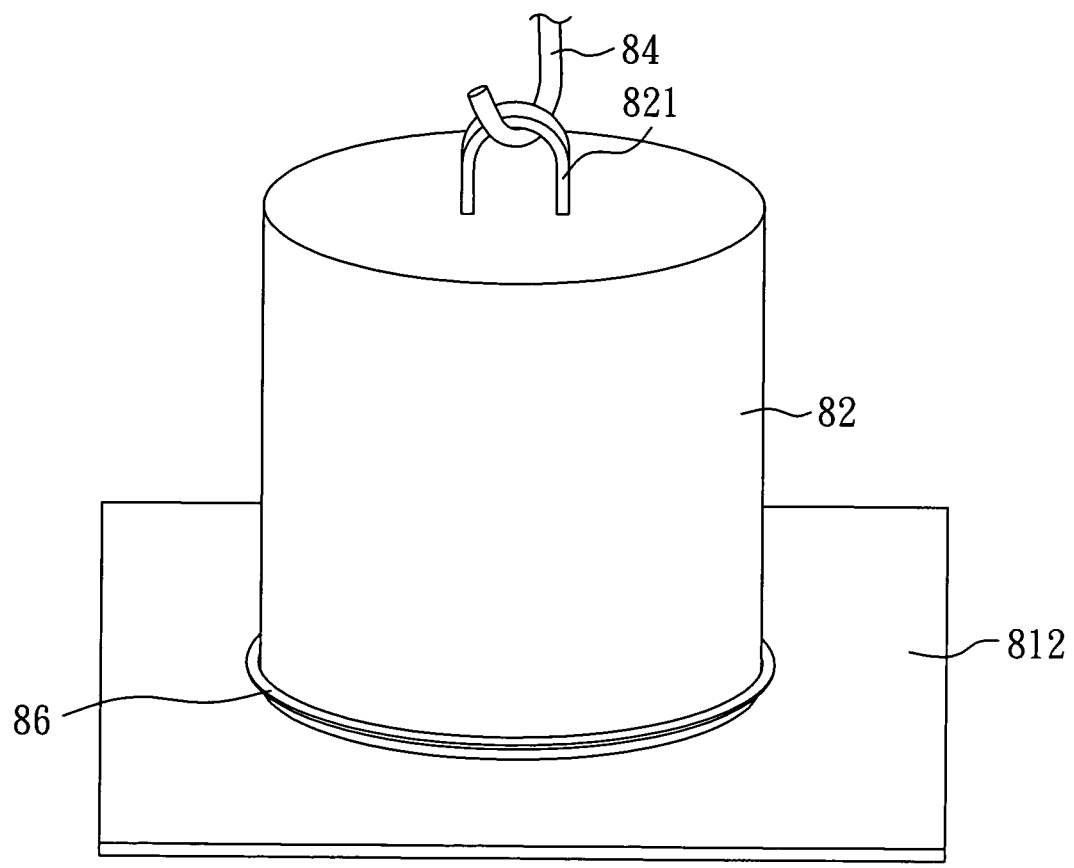
FIG. 18 is a perspective view showing how a powder filtration unit connects to other components in a three-dimensional object forming apparatus of the present invention.

FIG. 17 is a cross-sectional view along the A-A line of FIG. 15 with a powder filtration unit, and FIG. 18 is a perspective view showing how a powder filtration unit connects to other components in a three-dimensional object forming apparatus of the present invention. As shown in FIG. 17 and FIG. 18, the powder filtration unit 82 of the present invention can be a dust collecting bag, but is not limited thereto. The bottom of the powder filtration unit 82 corresponds to the opening 8121 and sheathes on the convex ring 8122. In addition, the sealing element 86 can loop the powder filtration unit 82 and the convex ring 8122 detachably to close the opening 8121. Therefore, the inner space of the housing 81 can be divided into a first space 813 and a second space 814 through the powder filtration unit 82. In the present embodiment, the sealing element 86 can be a tensional fillet. The suction inlet 811 is disposed inside the second space 814. The material of the powder filtration unit 82 can be non-woven fabric. In the present embodiment, the powder filtration unit 82 has a cylinder structure, and protrudes to the first space 813. However, the material and the structure of the powder filtration unit 82 are not limited to those described above.

As shown in FIG. 18 and FIG. 17, a connection part 821 is arranged on the top of the powder filtration unit 82 in the present invention, so the powder filtration unit 82 can perform the filtration process effectively. The connection part 821 can has a hollow cylinder structure, but is not limited thereto. In addition, the connection part 821 is detachably connected to the supporting element 84 inside the first space 813. Also, the support of the supporting element 84 can make the powder filtration unit 82 open upward completely to perform the filtration process effectively.

As shown in FIG. 15 and FIG. 17, the recycle unit 83 of the present invention is arranged inside the second space 814. In addition, the suction unit 85 can be a blower, which comprises a draught inlet 851 and an exhaust outlet 852. Herein, the draught inlet 851 extends into the housing 81 and communicates with the first space 813. During the operation of the suction unit 85, the air draught and exhaustion are respectively accomplished through the draught inlet 851 and the exhaust outlet 852, so the first space 813 is in a negative pressure. Hence, the circulating powder, the trajectories of which are generated during turbulence in the operation of the three-dimensional object forming apparatus 1, can be attracted into the second space 814 through the pipe 88 and a suction inlet 811. In addition, the attracted powder can be separated through the powder filtration unit 82, so the powder do not pass through the suction unit 85 whereby the lifespan of the suction unit 85 can be maximized. When the suction unit 85 is stopped, the powder separated by the powder filtration unit 82 drops into the recycle unit 83. Hence, the objects of dust-proofing of the printing head and recycling of the circulating powder can be accomplished.

As shown in FIG. 13, the powder filtration unit 8 may further comprise a door plate 89 combining with the housing 81, so the inner of the housing 81 can be keep in a sealed state. As shown in FIG. 13 and FIG. 15, the second space 814 inside the housing 81 may further comprise an exhausting hole 87, which is usually closed. If the redundant powder further has to be removed, a suction unit (not shown in the figure) can be connected to the exhausting hole 87 to connect to the powder filtration unit 8. In this case, the redundant powder can be removed more effectively. As shown in FIG. 16, FIG. 17, and FIG. 18, the powder filtration unit 82 of the present invention detachably loops on the convex ring 8122 through the sealing element 86, and the powder filtration unit 82 can be assembled or disassembled quickly. When the powder filtration unit 82 has to be disassembled for cleaning, the powder filtration unit 82 can be disassembled for removing the powder accumulated therein by detaching the connection part 821 from the supporting element 84 and detaching sealing element 86 from the powder filtration unit 82. Hence, the powder filtration unit 8 can keep its function of filtration. However, not only one powder filtration unit 82 can be installed inside the housing 81 of the powder filtration unit 8, plural powder filtration units 82 may also be installed if it is required.

In conclusion, each side of the three-dimensional object forming apparatus of the present invention is respectively arranged with a powder supplying tank and a temporary storage tank, so the powder supplying tank can provide powder into the corresponding temporary storage tank. In addition, the printing module can drive the first temporary storage tank and the second temporary storage tank to perform the powder spreading process bi-directionally, and also the printing process bi-directionally. Therefore, the bi-directional powder-providing process, the bi-directional powder-spreading process, and the bi-directional printing process used in the present invention can increase the rate of powder spreading and printing.

According to the three-dimensional object forming apparatus and the method for forming a three-dimensional object of the present invention, the powder supplying tank provides powder with an amount for spreading on the entire surface of the construction platform into the temporary storage tank. In addition, each of the plural notches defined in the plate unit of the bottom of the temporary storage tank is arranged separately and horizontally, so the powder can be spread on the construction platform quantitatively and in section. Hence, the spreading density of the powder on the construction platform is uniform.

According to the three-dimensional object forming apparatus and the method for forming a three-dimensional object of the present invention, dust-proof devices such as the dust-proof transmission portion structure, the dust-proof construction tank structure, the dust-proof maintenance device structure, the dust-proof working environment structure, and the dust-proof storage tank structure are arranged to prevent the pollution from the circulating powder, which are generated during the printing process and the powder spreading process. Hence, the device and the components of the three-dimensional object forming apparatus can be kept in a normal state, and the whole apparatus can be separated from the dust completely. In addition, the dust-proof maintenance device structure can protect the cover component and the scraping component of the maintenance device when the printing process is not performed. Hence, the objectives of dust-proofing the printing head and preventing the printing head from becoming polluted and impaired by congealed adhesive can be accomplished.

According to the three-dimensional object forming apparatus and the method for forming a three-dimensional object of the present invention, the printing quality inspection component and the image detection component can be used to determine whether the printing head is blocked or not. In addition, the arrangement of the air recirculating and heating device can shorten the waiting time for the mold to dry, and protect the printing head.

According to the three-dimensional object forming apparatus and the method for forming a three-dimensional object of the present invention, the inner space of the housing is divided into a first space and a second space through the powder filtration unit to separate the suction unit from the powder and maximize the lifespan of the suction unit. In addition, the suction unit is used to keep the first space in a negative pressure state, so the powder can be attracted into the second space through the pipe and the suction inlet. Furthermore, the powder filtration unit can collect powder inside the recycle unit. Hence, through the arrangement of the powder filtration unit, the three-dimensional object forming apparatus can operate optimally in a good environment and is not influenced by the circulating powder. Also, the circulating powder can be recycled efficiently. Hence, it is unnecessary to clean the molds frequently in the present invention, and the negative influence on the three-dimensional object forming apparatus can be prevented. Therefore, the three-dimensional object forming apparatus and the method for forming a three-dimensional object of the present invention indeed have their production applicability.

Although the present invention has been explained in relation to its preferred embodiment, it is to be understood that many other possible modifications and variations can be made without departing from the scope of the invention as hereinafter claimed.

What is claimed is:

1. A three-dimensional object forming apparatus, comprising:
    a construction stage, including a loading platform;
    a printing module, arranged and movable on the construction stage, and including at least one printing cartridge for spraying a liquid;
    plural temporary storage tanks arranged on a left side and a right side of the printing module, wherein the temporary storage tanks are used for receiving powder and performing a powder spreading process quantitatively and in section in bi-direction, and the temporary storage tanks moveable with the printing module;
    plural powder supplying tanks, arranged on a left side and a right side of the construction stage, wherein the powder supplying tanks match with the temporary storage tanks, and a cap is arranged over each of the temporary storage tanks and is pushed by the powder supplying tank when the temporary storage tank connects to the powder supplying tank, so as to open the temporary storage tank and supply the powder into the temporary storage tank;
    a construction tank with a construction platform inside, wherein the construction tank is used for loading the powder dispensed from the temporary storage tank, and the printing module sprays the liquid on the powder dispensed from the temporary storage tank;

a printing quality inspection component, including a printing medium arranged on the loading platform of the construction stage, wherein the printing module forms a pattern on the printing medium, and the pattern is used to determine whether the printing module is blocked or not;

a maintenance device, including a cover component, and a scraping component, wherein the cover component and the scraping component are respectively arranged on the loading platform of the construction stage; and a dust-proof device, including a dust-proof transmission portion structure, a dust-proof construction tank structure, a dust-proof maintenance device structure, a dust-proof working environment structure, a storage tank dust-proof structure, wherein the dust-proof device is used to prevent pollution resulting from the powder circulating in the air during the powder spreading process and a printing process.

2. The apparatus as claimed in claim 1, wherein the printing quality inspection component is a printing medium, and the printing medium is made of frosted glass.

3. The apparatus as claimed in claim 1, further comprising an air recirculating and heating device, wherein the air recirculating and heating device comprises:

a heating device, generating hot air to accelerate solidification of the powder with the liquid sprayed thereon; and an air recirculation tunnel, which is used for absorbing the powder circulating in the air during the powder spreading process and a printing process, and leading the hot air discharge from the air recirculation tunnel to reduce deterioration of the printing cartridge of the printing module.

4. The apparatus as claimed in claim 1, further comprising a continuous liquid supply device, which provides the liquid to the at least one printing cartridge of the printing module, to perform the printing process on the powder.

5. The apparatus as claimed in claim 1, further comprising a powder filtration device, which comprises: a housing, a powder filtration unit, a recycle unit, and a suction unit, wherein the housing includes a suction inlet, the powder filtration unit is arranged inside the housing to divide an inner space of the housing into a first space and a second space, the suction inlet of the housing connects to the second space, the recycle unit is arranged inside the second space, the suction unit connects to the first space to make the first space in a negative pressure, the powder circulating in the air are attracted by the suction inlet and introduced into the second space, the powder filtration unit filters the powder attracted by the suction inlet, and the powder filtered out by the powder filtration unit are recycled to the recycle unit.

6. The apparatus as claimed in claim 1, wherein a set of first rollers and a set of second rollers are arranged inside the powder supplying tank, the first rollers agitate the powder inside the powder supplying tank, the second rollers quantitatively supply the powder into the temporary storage tank with an amount for spreading on an entire surface of the construction platform, the temporary storage tank moves with the printing module, and the temporary storage tank cooperates with the powder supplying tank to spread the powder quantitatively on the construction platform.

7. The apparatus as claimed in claim 1, wherein the temporary storage tank comprises plural openings arranged separately and horizontally, the temporary storage tank comprises a driving unit and a plate unit, the driving unit connects with the plate unit to eccentrically drive the plate unit moving horizontally, the plate unit comprises plural notches arranged separately and horizontally, and when the plate unit moves, the plural notches connect with the plural openings to spread the powder on the construction platform in section.

8. The apparatus as claimed in claim 1, wherein the cover component of the maintenance device comprises: a protection cover, and at least one sealing unit arranged inside the protection cover, the cover component contacts and covers a printing head of the printing module when the printing cartridge is not activated; the scraping component of the maintenance device comprises: a rotatable body, driven wheels, and at least one wiper, one of the driven wheels drives the rotatable body to rotate, and the at least one wiper is arranged on and moves with the rotatable body to clean the printing head of the printing module.

9. The apparatus as claimed in claim 8, wherein the maintenance device further comprises: a dust-proof cover component for covering the scraping component when the scraping component is not activated, the dust-proof cover component comprises: a body, a movable cap, and an elastic element with two ends, the body is sheathed in the movable cap, one end of the elastic element fixes to the body, the other end of the elastic element connects to the movable cap, the movable cap is pulled by the elastic element to shelter the cover component when the cover component is not activated, and the cover component is exposed to cover the printing head when the movable cap is pushed.

10. The apparatus as claimed in claim 1, wherein the dust-proof transmission portion structure of the dust-proof device comprises: a dust-proof plate unit and a telescopic dust-proof tube, the dust-proof plate unit wraps around a transmission portion, and the telescopic dust-proof tube is arranged extensibly on a track formed by the dust-proof plate unit to separate the powder from the transmission portion.

11. The apparatus as claimed in claim 1, wherein the dust-proof construction tank structure of the dust-proof device comprises: a falling-powder dust-proof portion, and a first suction unit, the falling-powder dust-proof portion wraps around the construction tank to collect the powder circulating in the air during the powder spreading process and a printing process, and the first suction unit accelerates and introduces the falling-powder dust-proof portion collecting the powder circulating in the air.

12. The apparatus as claimed in claim 9, wherein the dust-proof maintenance device structure comprises: the dust-proof cover component and a dust-proof cleaning component, and the dust-proof cleaning component protects the scraping component when the scraping component is not activated.

13. The apparatus as claimed in claim 12, wherein each of parallel sides of the printing module is installed with a plate unit, and the plate unit comprises a protrusion bar.

14. The apparatus as claimed in claim 13, wherein the dust-proof cleaning component comprises a cap and a restoring unit, the cap is pivoted on the scraping component of the maintenance device, the cap comprises a driven gear arranged to mesh with the driven wheels of the scraping component, the restoring unit hooks on the scraping component to control rotation of the cap on the scraping component, the cap is pushed by the protrusion bar of the printing module to make the driven gear drive the driven wheels, and the driven wheels drive the wiper in an open state or in a closed state.

15. The apparatus as claimed in claim 14, wherein the cap of the dust-proof cleaning component comprises a route-leading unit, the route-leading unit comprises a declined plane and a pushing plane, the pushing plane pushes the protrusion bar of the plate unit, the cap is rotated by a thrust force of the plate unit to expose the scraping component to clean the printing head of the printing module.

16. The apparatus as claimed in claim 15, wherein when the route-leading unit of the cap of the dust-proof cleaning component is not pushed by the protrusion bar of the plate unit, the restoring unit turns and pulls the rotation of cap to shield the scraping component.

17. The apparatus as claimed in claim 14, wherein when the protrusion bar of the plate unit moves along the declined plane of the route-leading unit, the protrusion bar does not push the cap and passes the cap to keep the cap shielded by the scraping component.

18. The apparatus as claimed in claim 1, wherein the dust-proof working environment structure of the dust-proof device comprises: a hole, a pipe, and a second suction unit, the hole is arranged on the construction stage, the pipe connects the hole and the second suction unit, the second suction unit generates a negative pressure to attract the powder circulating in the air.

19. The apparatus as claimed in claim 1, wherein the dust-proof storage tank structure of the dust-proof device comprises: the cap, an elastic element, and a declined structure arranged in the temporary storage tank, the cap is arranged over a notch of the temporary storage tank, the cap connects to the temporary storage tank through the elastic element, the cap moves left and right to close the notch of the temporary storage tank and prevent the powder in the temporary storage tank from circulating in the air, and the declined structure introduces the powder falling into the temporary storage tank directly and prevents the powder circulating in the air.

\* \* \* \* \*